United States Patent [19]

Akiba et al.

[11] Patent Number: 5,287,031
[45] Date of Patent: Feb. 15, 1994

[54] DEVICE FOR SUPPORTING AND LINEARLY MOVING AN OBJECT

[75] Inventors: Toshikatsu Akiba, Yokohama; Shitta Shingu; Kenichi Takahara, both of Tokyo; Hiroshi Takahashi; Arata Tanaka, both of Yokohama, all of Japan

[73] Assignee: Kabushiki Kaisha Toshiba, Kawasaki, Japan

[21] Appl. No.: 935,874

[22] Filed: Aug. 26, 1992

[30] Foreign Application Priority Data

| Aug. 26, 1991 | [JP] | Japan | 3-213617 |
| Oct. 25, 1991 | [JP] | Japan | 3-279972 |
| Oct. 25, 1991 | [JP] | Japan | 3-280059 |
| Oct. 25, 1991 | [JP] | Japan | 3-280135 |
| Oct. 25, 1991 | [JP] | Japan | 3-280136 |

[51] Int. Cl.$^5$ .................... H02K 7/09; H02K 41/00
[52] U.S. Cl. ........................ 310/90.5; 310/12
[58] Field of Search ............. 310/90.5, 12, 68 B, 310/51

[56] References Cited

U.S. PATENT DOCUMENTS

| 3,809,481 | 5/1974 | Schindler . | |
| 4,387,935 | 6/1983 | Studer | 310/12 X |
| 4,473,259 | 9/1984 | Goldowski | 310/90.5 |
| 4,583,794 | 4/1986 | Takahara et al. | 310/90.5 |
| 4,644,205 | 2/1987 | Sudo et al. | 310/90.5 |
| 4,652,780 | 3/1987 | Murakami et al. | 310/90.5 |
| 4,885,490 | 12/1989 | Takahara et al. | 310/90.5 |
| 4,947,067 | 8/1990 | Habermann et al. | 310/90.5 X |
| 5,053,662 | 1/1991 | Richter | 310/90.5 |
| 5,059,845 | 10/1991 | Wilson | 310/90.5 |

FOREIGN PATENT DOCUMENTS 2503304 10/1982 France .
WO84/01211 3/1984 PCT Int'l Appl. .

OTHER PUBLICATIONS

Proceedings of First International Symposium on Experimental Robotics, Jun. 19, 1989, pp. 229-243, M. Tsuda, et al., "High-Speed Digital Controller for Magnetic Servo Levitation of Robot Mechanisms."
Proceedings of Second International Symposium on Magnetic Bearing, Jul. 12-14, 1990, pp. 109-114, M. Ota, et al., "Mag-Lev Semiconductor Wafer Transporter for Ultra-High-Vacuum Environment."
Applied Optics, vol. 10, No. 6, Jun. 1971, pp. 1376-1382, R. A. Hanel, et al. "Nimbus 4 Michelson Interferometer."
Patent Abstracts of Japan, vol. 10, No. 80 (P-441)(2137), Mar. 29, 1986, & JP-A-60 217 318, Oct. 30, 1985, Yasuhiko Iwai, "Optical Axis Aligning Device".
Patent Abstracts of Japan, vol. 9, No. 16 (P-329)(1739), Jan. 23, 1985, & JP-A-59 163 525, Sep. 14, 1984, Seiji Nishizawa, et al., "Movable Mirror Driving Device of Continuous Driving Type Michelson's Interferometer".

Primary Examiner—Emanuel T. Voeltz
Assistant Examiner—E. To
Attorney, Agent, or Firm—Oblon, Spivak, McClelland, Maier & Neustadt

[57] ABSTRACT

A movable member is situated within a cylindrical member so as to be axially movable. The movable member is supported by a magnetic bearing device in relation to the cylindrical member in a perfect non-contact manner. The cylindrical member and movable member are provided with an electromagnetic force generating mechanism for selectively applying an axial driving force to the movable member in a non-contact manner. The movable member is provided with an auxiliary plate having an inclined surface inclined with respect to the axis of the movable member. The axial position of the movable member is detected by the output of a detector which detects the distance between itself and the inclined surface. On the basis of the detected axial position and an objective position, the electromagnetic force generating mechanism is activated to set the axial position of the movable member.

18 Claims, 24 Drawing Sheets

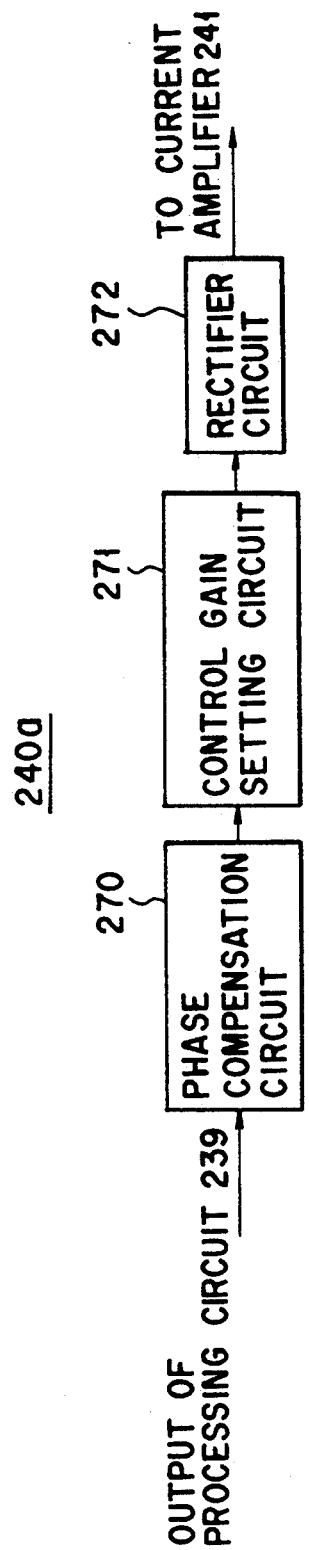
F I G. 14

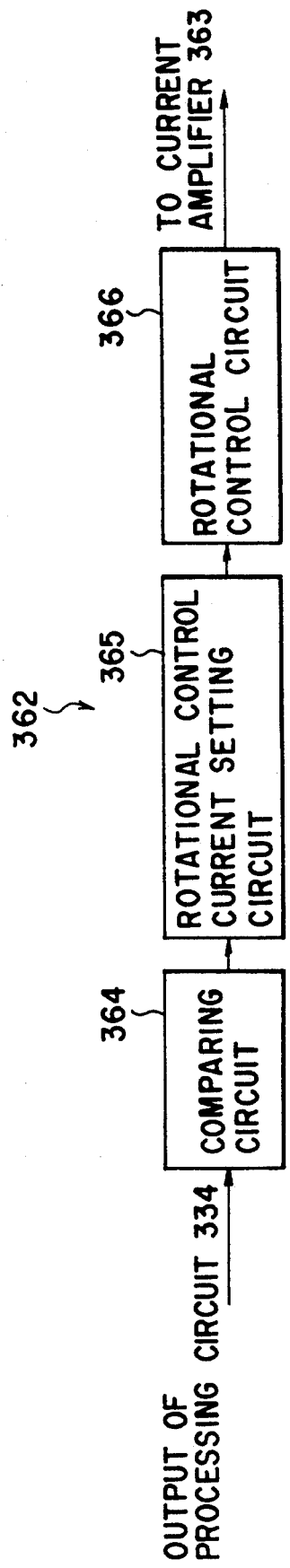
F I G. 18

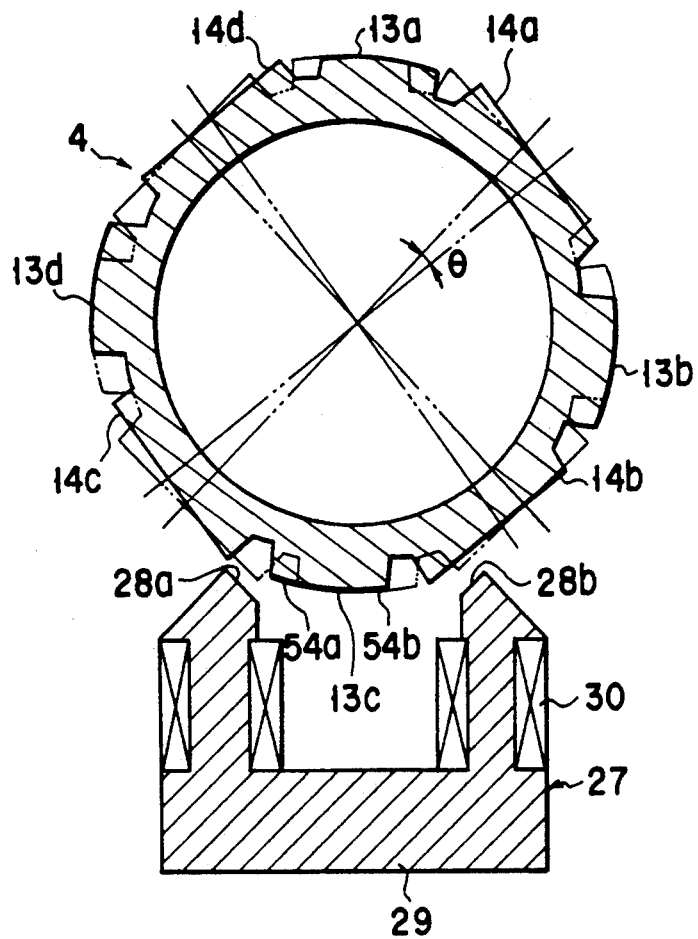
F I G. 19

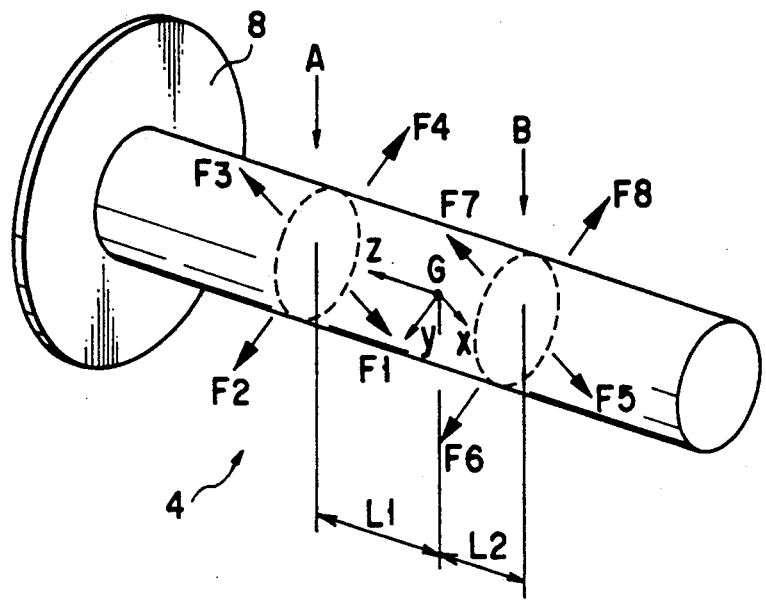
F I G. 21
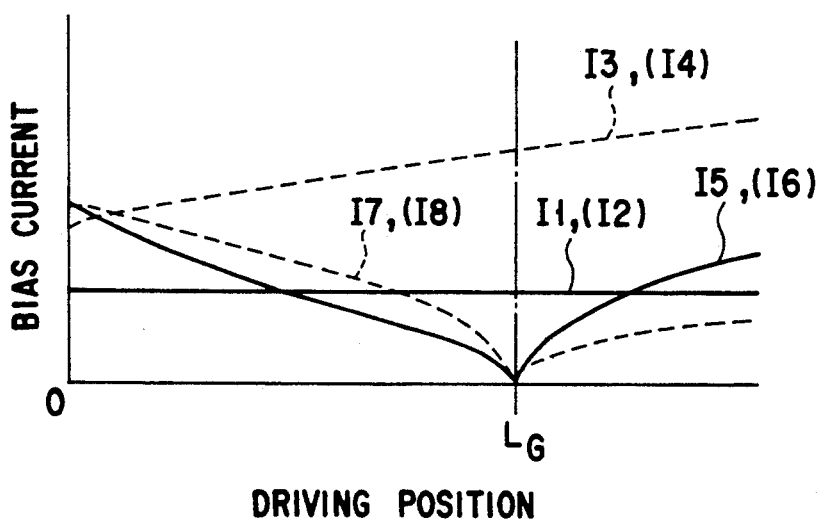
F I G. 22

DEVICE FOR SUPPORTING AND LINEARLY MOVING AN OBJECT

BACKGROUND OF THE INVENTION

1. Field of the Invention

The present invention relates to a device for supporting and linearly moving an object such as a scan mirror of an optical interferometer or a precision linear table, which must be positioned precisely.

2. Description of the Related Art

As is well known, a supporting device for supporting an object such as a scan mirror of an optical interferometer or a precision linear table is required to have a function for precisely positioning the object. To meet this requirement, a device for supporting and linearly moving an object comprises, in general, the mechanical elements: a movable member for supporting an object such as a scan mirror, a guide mechanism for linearly guiding the movable member smoothly, and a precise ball screw feed mechanism for moving the movable member.

In this linear movement/support device adopting the above mechanical positioning system, the structural parts must be machined with very high precision. Even if the parts are machined precisely, a problem of a ball screw, e.g. backlash, cannot perfectly be prevented. Thus, the linear movement/support device adopting the mechanical positioning system has a limit in positioning precision. In addition, when this linear movement/support device is used in special environment (e.g. high temperature, high vacuum, etc.), lubrication of the ball screw may be deteriorated. Thus, this device cannot be used in the special environment for a long time.

In order to overcome the above problems, there has been proposed a linear movement/support device wherein an object which is moved by linear actuator is supported by a support spring. However, since the range of positioning for the object is limited by the resiliency of the plate spring, it is difficult to perform positioning in a wide range.

Further, in order to overcome the above problems, there has been proposed a linear movement/support device wherein a movable member is levitated by a magnetic force, i.e. a magnetic bearing, in a perfect non-contact manner. However, this device using the magnetic bearing has the following problem. In the linear movement/support device using the magnetic bearing, if the top portions of the stationary member-side magnetic poles face to the movable member-side, which magnetic poles are formed in projecting shapes, vibration of the movable member about its axis due to external disturbance can be passively damped by a magnetic attraction force acting between both magnetic poles. However, the vibration damping effect of such passive manner is low, and vibration may continue and a control system for the magnetic bearing may become unstable. Further, when the movable member must be positioned precisely, high precision cannot be maintained owing to the vibration.

Besides, in order to solve the above problems, it has been thought that new structural parts are added to construct a linear movement/support device wherein a fluid damper is used or mechanical friction is utilized According to this, however, the load capacitance of the linear movement/support device itself lowers.

This type of linear movement/support device has more problems. Specifically, the center of gravity of the movable member moves relative to the magnetic bearing in accordance with axial movement of the movable member, with the result that a magnetic support control system becomes unstable. Further, when the stationary member for supporting the movable member is vibrated owing to external vibration, the movable member makes a compound movement of movement of its center of gravity and rotational movement about the center of gravity. Thus, the positioning precision cannot be maintained.

Furthermore, this type of linear movement/support device has the following problem. Regarding the magnetic bearing, it is necessary to detect a radial position of the movable member by means of a position detector and feed the detection output back to a levitation control system, thereby controlling the levitation position. Thus, the precision of the position of the movable member in the case of linearly moving the movable member over a long distance is determined by the machining precision of position-detecting parts such as position detecting on surfaces. Since the machining precision of the parts is limited, the precision of, e.g. directivity of a scan mirror of an optical interferometer is limited by the machining precision When the movable member is supported by the magnetic bearing, all six degrees of freedom of the movable member must be controlled, resulting in complexity of control circuits.

SUMMARY OF THE INVENTION

An object of the present invention is to provide a linear movement/support device capable of performing a sure support function and a precise long-distance positioning function over a long time.

Another object of the invention is to provide a linear movement/support device capable of detecting a rotational displacement of a movable member about its axis and effectively suppressing vibration of the movable member about its axis, without increasing the number of electromagnets or position detectors of a magnetic bearing.

Still another object of the invention is to provide a linear movement/support device having stable support characteristics and stability against external disturbance over the entire axial movement distance of a movable member.

The present invention is achieved by a device for supporting and linearly moving an object, said device comprising:

a stationary body having a cylindrical internal bore;

a movable member coupled to the object and situated within the cylindrical internal bore of the stationary body to be axially movable in the cylindrical internal bore of the stationary body;

a magnetic bearing device for electromagnetically levitating the movable member in relation to the stationary body, the magnetic bearing device comprising a plurality of electromagnet elements arranged between the inner peripheral surface of the stationary body and the outer peripheral surface of the movable member at predetermined intervals in the circumferential direction of the stationary body and the movable member;

position detection means, arranged between the electromagnet elements, for detecting at least one of the axial position and radial position of the movable member in the cylindrical internal bore in a non-contact manner;

electromagnetic force generating means, disposed on the stationary body and the movable member, for generating an electromagnetic force to be applied to the movable member to move the movable member axially; and control means for controlling at least one of the electromagnetic force generating means and the magnetic bearing device on the basis of an output from the position detection means, thereby setting at least one of the axial position and the radial position of the movable member in the cylindrical internal bore of the stationary body at a predetermined position The present invention is achieved by a device for supporting and linearly moving an object, said device comprising:

a stationary body having a cylindrical internal bore;

a movable member coupled to the object and situated within the cylindrical internal bore of the stationary body to be axially movable in the cylindrical internal bore of the stationary body;

yokes fixed on the inner peripheral portion of the stationary body at predetermined intervals in the circumferential direction of the inner peripheral portion of the stationary body, such that magnetic pole faces of the yokes are directed to the movable member;

coils mounted on the yokes;

projecting magnetic poles formed on the outer peripheral portion of the movable member, such that projecting faces of the projecting magnetic poles, which are opposed to the magnetic pole faces of the yokes, are arranged at predetermined intervals in the circumferential direction of the outer peripheral portion of the movable member and extend in the axial direction of the movable member;

position detection faces formed on the outer peripheral portion of the movable member along the circumference of the outer peripheral portion of the movable member between the projecting magnetic poles, the position detection faces extending axially;

position detectors, disposed on the stationary body and opposed to the position detection faces, for detecting the positions of the position detection faces, thereby detecting the distance between the movable member and a predetermined position in a non-contact manner;

levitation means for controlling an electric current to be supplied to the coils on the basis of outputs of the position detectors, thereby electromagnetically levitating the movable member at a predetermined position in the cylindrical internal bore; and vibration damping means for controlling an electric current to be supplied to the coils on the basis of a sum signal of at least two of the outputs of the position detectors.

The invention is achieved by a device for supporting and linearly moving an object, said device comprising:

a stationary body having a cylindrical internal bore;

a movable member coupled to the object and situated within the cylindrical internal bore of the stationary body to be axially movable in the cylindrical internal bore of the stationary body;

yokes fixed on the inner peripheral portion of the stationary body at predetermined intervals in the circumferential direction of the inner peripheral portion of the stationary body, such that magnetic pole faces of the yokes are directed to the movable member;

coils mounted on the yokes;

projecting magnetic poles formed on the outer peripheral portion of the movable member, such that projecting faces of the projecting magnetic poles, which are opposed to the magnetic pole faces of the yokes, are arranged at predetermined intervals in the circumferential direction of the outer peripheral portion of the movable member and extend in the axial direction of the movable member;

position detection faces formed on the outer peripheral portion of the movable member along the circumference of the outer peripheral portion of the movable member between the projecting magnetic poles, the position detection faces extending axially;

position detectors, disposed on the stationary body and opposed to the position detection faces, for detecting the positions of the position detection faces, thereby detecting the distance between the movable member and a predetermined position in a non-contact manner;

levitation means for controlling an electric current to be supplied to the coils on the basis of outputs of the position detectors, thereby electromagnetically levitating the movable member at a predetermined position in the cylindrical internal bore;

a rotation control yoke situated such that a magnetic pole face thereof is directed to both circumferential end portions of at least one of the projecting magnetic poles formed on the movable member;

a control coil mounted on the rotation control yoke;

data acquisition means for acquiring rotational displacement data of the movable member on the basis of a sum signal of at least two of outputs from the position detectors; and vibration damping means for activating the control coil on the basis of a rotational displacement amount represented by the rotational displacement data acquired by the acquiring means, thereby damping the vibration of the movable member about its axis.

The invention is achieved by a device for supporting and linearly moving an object, said device comprising:

a stationary body having a cylindrical internal bore;

a movable member coupled to the object and situated within the cylindrical internal bore of the stationary body to be axially movable in the cylindrical internal bore of the stationary body;

electromagnets arranged between the inner peripheral surface of the stationary body and the outer peripheral surface of the movable member at two or more axial points, said electromagnets electromagnetically levitating the movable member in relation to the stationary body;

radial position detection means for detecting the radial position of the movable member;

magnet control means for controlling the magnetic force of the electromagnets on the basis of an output from the radial position detection means;

axial movement amount detection means for detecting the axial movement amount of the movable member;

driving means for applying an axial driving force to the movable member; and control parameter adjusting means for adjusting a control parameter of the magnet control means in accordance with an output from the axial movement amount detection means.

The invention is achieved by a device for supporting and linearly moving an object, said device comprising:

a stationary body having a cylindrical internal bore;

a movable member coupled to the object and situated within the cylindrical internal bore of the stationary body to be axially movable in the cylindrical internal bore of the stationary body;

axial position detection means for detecting the axial position of the movable member in a non-contact manner;

a magnetic bearing device comprising electromagnets arranged between the inner peripheral surface of the stationary body and the outer peripheral surface of the movable member at predetermined intervals in the circumferential direction of the stationary body and the movable member, said electromagnets electromagnetically levitating the movable member in relation to the stationary body;

a data table storing correction data for correcting at least an attitude error of the movable member over the entire axial movement range of the movable member;

read-out means for reading out, from the data table, the correction data corresponding to the axial position represented by the axial position data acquired by the axial position detection means; and attitude adjusting means for adjusting at least the attitude of the movable member by delivering the correction data read out by the read-out means to the magnetic bearing device.

According to the present invention, the movable member for supporting the object is supported by the magnetic bearing device in relation to the stationary body in a non-contact manner. The axial position of the movable member is detected by the axial position detection means in non-contact with the movable member. The axial driving force is applied to the movable member by the electromagnetic force generating mechanism in non-contact with the movable member. Accordingly, the movable member can be moved without friction, and no lubricant is required. Thus, this linear movement/support device can be used for a long time in a special environment. Since the movable member can be moved without using a mechanical coupling/feeding mechanism, there is no error factor such as backlash in the positioning process. Accordingly, precise positioning can be achieved. Where a voice coil motor, for example, is used for the electromagnetic force generating mechanism, high-precision positioning can be achieved over a long distance without losing the above merits.

According to the present invention, the flat position detection faces are formed on the outer peripheral surface of the movable member, and the position detectors are provided on the stationary body so as to be opposed to the position detection faces. Thus, where the position detectors of the volume variation detection type, e.g. eddy current type position detectors, are used, not only the radial displacement signal but also the rotational displacement signal can be obtained by the process described below on the basis of the outputs of the position detectors. The levitation control system controls the coil currents on the basis of the radial displacement signal, and the vibration damping control system controls the coil currents commonly on the basis of the rotational displacement signal. Accordingly, the rotational vibration damping control can be achieved without increasing the number of electromagnets or position detectors, unlike the prior art. When the absolute value of the rotational displacement signal is large, the current to the coils is increased accordingly, thereby effectively damping the vibration of the movable member about its own axis. The movable member is situated at almost the center of the bore, even if the current is superimposed on the coils to damp the vibration about the axis, the radial attraction force is balanced and only the vibration of the movable member about is axis is damped. Thus, the radial position of the movable member is maintained at the objective position.

In addition, according to the present invention, not only the radial displacement signal but also the rotational displacement signal can be obtained by the process described below on the basis of the outputs of the position detectors. The levitation control system controls the coil currents for levitation on the basis of the radial displacement signal, and the vibration damping control system controls the current to the control coil mounted on the rotational control yoke on the basis of the rotational displacement signal. Accordingly, the vibration of the movable member about its axis can effectively be damped.

According to the present invention, the control parameter of the magnetic support control system is updated on the basis of the axial movement distance of the movable member. Thus, the stable support system is realized over the axial movement range of the movable member. If the control parameter is adjusted to meet the non-interference conditions, the control system can be designed independently from the center-of-gravity movement or rotational movement. Thus, the design of the control system is simplified, and external vibration is suppressed by relatively easy means. Specifically, there is, theoretically, no influence on the rotational movement due to external disturbance in the center-of-gravity direction. Thus, when the precise positioning for the rotational movement of the movable member is performed, transmitted vibration can of the center-of-gravity movement be reduced and high positioning precision can be maintained by increasing the characteristic frequency of the rotational movement system and decreasing the characteristic frequency of the center-of-gravity movement system. On the other hand, the precise positioning for the center-of-gravity movement can be performed by suppressing resonance of the support system by the adjustment at the compensation parameter and damping stopping vibration. If the adjustment for non-interference support is performed by the constant excitation current and the adjustment of support characteristics is performed by the compensation parameter, the control system for center-of-gravity movement can be designed separately from the control system for rotational movement. In addition, calculations are not complex and are easy and exact.

Furthermore, according to the present invention, the precision of the attitude and position of the movable member supported by the magnetic bearing device is influenced by the machining precision of the position detection faces, etc. for radial position detection, as stated above. The error in attitude or position of the movable member caused by the machining precision has high reproducibility over the axial movement range of the movable member. Thus, in this invention, the relationship between the axial position of the movable member and at least its attitude error is grasped in advance, and the correction data for correcting the error is stored on the data table. The axial position correction data is read out from the data table in accordance with the output from the axial position detection means. The read-out correction data is supplied to the magnetic bearing device to adjust the attitude of the movable member. Therefore, the precision in, at least, the attitude of the movable member can be enhanced, irrespective of the machining precision of the position detection faces, etc.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 14 shows a modification of the control circuit in the vibration damping controller of the device of the third embodiment;

FIG. 18 is a block diagram of a vibration damping controller in the controller of the device according to the fourth embodiment;

FIG. 19 illustrates the principle of vibration damping in the fourth embodiment;

FIG. 21 illustrates a force equilibrium condition and a non-interference condition in the fifth embodiment;

FIG. 22 is a graph showing an example of relationship between the amount of movement of the movable body and steady exciting current in the fifth embodiment;

DETAILED DESCRIPTION OF THE PREFERRED EMBODIMENTS

Figure 1:
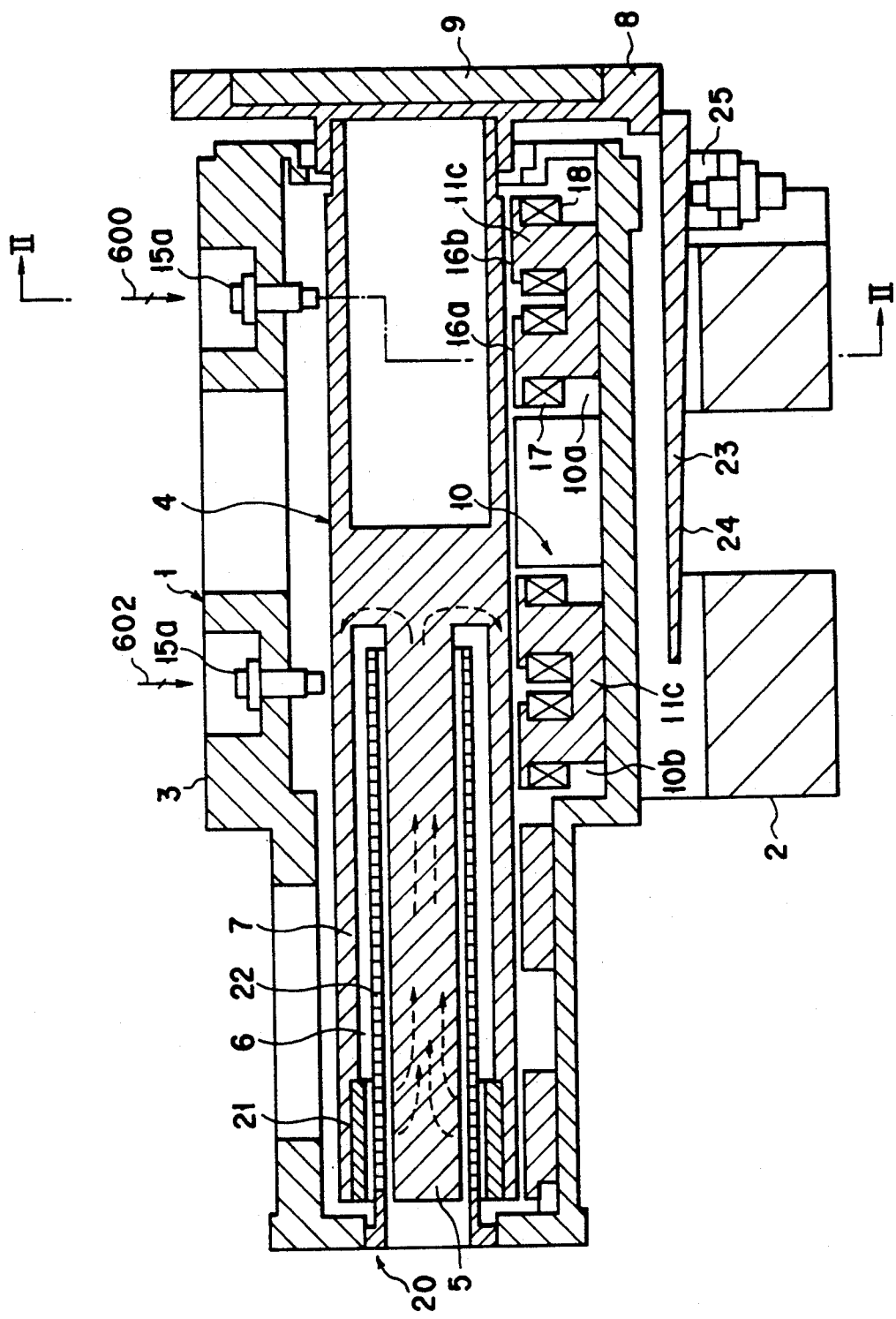
FIG. 1 is a cross-sectional view of a linear movement/support device according to a first embodiment of the present invention, taken along line I—I in FIG. 2, as viewed in the direction of arrows.

FIG. 1 is a cross-sectional view showing schematically a linear movement/support device according to a first embodiment of the present invention, taken along the axis of the device. This device supports a scan mirror of an optical interferometer for measuring a gas distribution.

In FIG. 1, a stationary body 1 comprises a base 2 and a non-magnetic cylindrical member 3 fixed on the base 2. A substantially columnar movable member 4 is situated within the cylindrical member 3 so as to be movable along the axis of the cylindrical member 3.

The movable member 4 is formed of a magnetic material. An almost right half portion of the movable member 4 (in FIG. 1) is hollow, and an almost left half portion thereof is constructed such that a center rod portion 5, a cylindrical bore 6 and an outer cylindrical portion 7 are concentrically arranged. A mirror support member 8 is mounted on a right end portion (in FIG. 1) of the movable member 4. A scan mirror 9 is fixed on the mirror support member 8.

A magnetic bearing 10 is situated between the cylindrical member 3 and movable member 4 and supports the movable member 4 in non-contact with the cylindrical member 3. Specifically, main components 10a and 10b of the magnetic bearing 10 are provided at two axial positions of the cylindrical member 3 and movable member 4, i.e. points indicated by arrows 600 and 602 in FIG. 1.

Figure 2:
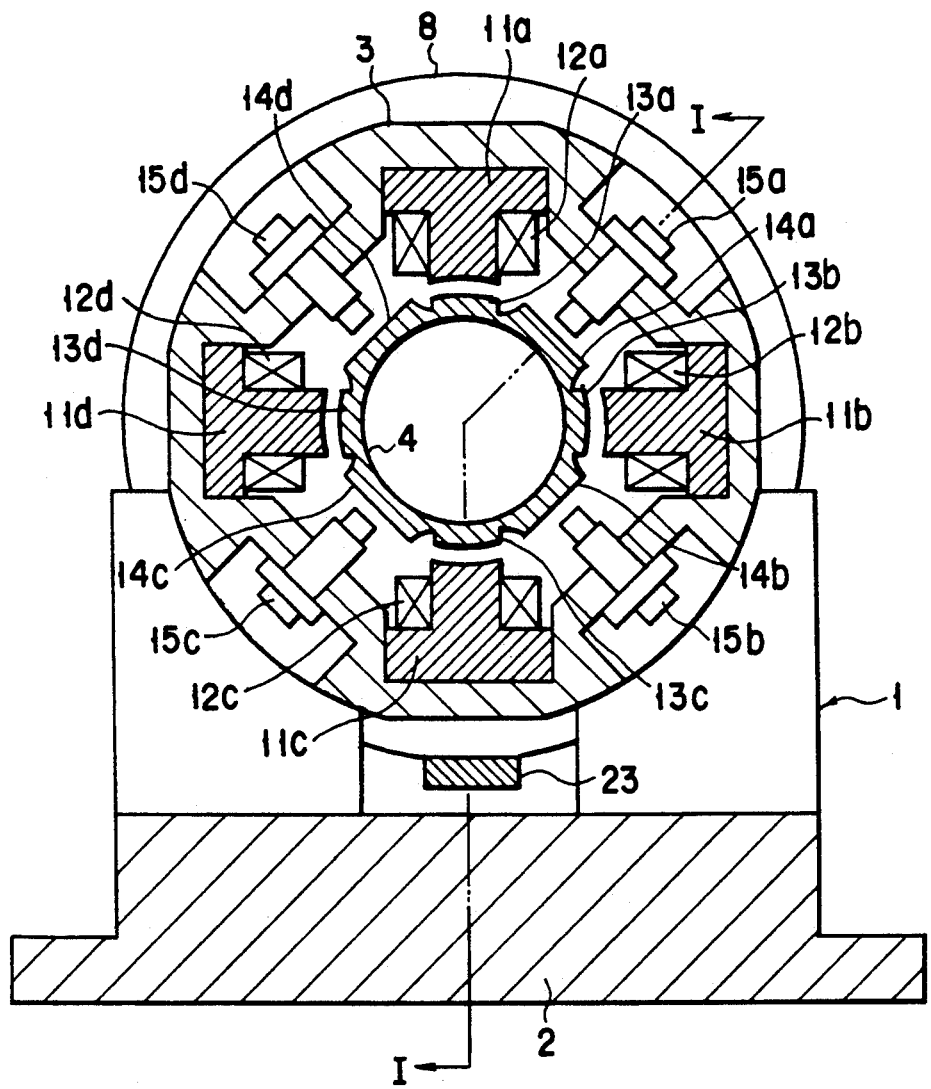
FIG. 2 is a cross-sectional view of the device according to the first embodiment, taken along line II—II in FIG. 1, as viewed in the direction of arrows.

The magnetic bearing 10 is of attraction support type. FIG. 2 shows representatively the main component 10a (indicated by arrow 600) of main components 10a and 10b of the magnetic bearing 10. Specifically, the main component 10a comprises yokes 11a, 11b, 11c and 11d, coils 12a, 12b, 12c and 12d, projecting magnetic poles 13a, 13b, 13c and 13d, flat faces 14a, 14b, 14c and 14d, and radial position detectors 15a, 15b, 15c and 15d. The yokes 11a, 11b, 11c and 11d are fixed on the inner surface of the cylindrical member 3 at angular intervals of 90° in the circumferential direction. The magnetic pole faces of the yokes on the stationary body 11a, 11b, 11c and 11d are directed to the axis of the movable member 4. The coils 12a, 12b, 12c and 12d are mounted on the yokes 11a, 11b, 11c and 11d. The projecting magnetic-poles 13a, 13b, 13c and 13d are formed on the outer peripheral surface of the movable member 4 at angular intervals of 90° in the circumferential direction. The projecting magnetic poles 13a, 13b, 13c and 13d extend substantially over the entire axial length of the movable member 4. The flat faces 14a, 14b, 14c and 14d are used for detecting a radial positional displacement of the movable member 4. The flat faces 14a, 14b, 14c and 14d are formed on the outer peripheral surfaces of the movable member 4 and interposed between the projecting magnetic poles 13a, 13b, 13c and 13d. The flat faces 14a, 14b, 14c and 14d extend substantially over the entire axial length of the movable member 4. The radial position detectors 15a, 15b, 15c and 15d detect the distance between the radial position detectors 15a, 15b, 15c and 15d and the flat faces 14a, 14b, 14c and 14d. The radial position detectors 15a, 15b, 15c and 15d are fixed on the cylindrical member 3. The radial position detector 15a is fixed at a predetermined position on the cylindrical member 3 between the yokes 11a and 11b. The radial position detector 15b is fixed at a predetermined position on the cylindrical member 3 between the yokes 11b and 11c. The radial position detector 15c is fixed at a predetermined position on the cylindrical member 3 between the yokes 11c and 11d. The radial position detector 15d is fixed at a predetermined position on the cylindrical member 3 between the yokes 11d and 11a.

FIG. 1 shows representatively the yoke 11c of the yokes 11a, 11b, 11c and 11d. The yoke 11c has two magnetic pole faces 16a and 16b and is fixed on the inner surface of the cylindrical member 3 such that these two magnetic pole faces 16a and 16b are axially arranged. The coils 12a, 12b, 12c and 12d mounted on the yokes 11a, 11b, 11c and 11d comprise bias coils 17 and control coils 18. The bias coils 17 mounted on the yokes opposed to each other with the movable member 4 interposed are connected in series so as to generate magnetic fluxes in opposite directions. On the other hand, the control coils 18 mounted on these yokes are connected in series so as to generate magnetic fluxes in the same direction.

The two magnetic pole faces 16a and 16b of each of the yokes 11a, 11b, 11c and 11d and the magnetic pole faces of the four projecting magnetic poles 13a, 13b, 13c and 13d provided on the movable member 4 have arcuated cylindrical shapes, defined about the axis of the movable member 4, so as to stabilize the magnetic resistance between the pole faces 16a and 16b of each yoke, on the one hand, and the pole faces of the poles 13a, 13b, 13c and 13d, on the other hand. The other main component 10b has the same structure as the main component 10a.

As is shown in FIG. 1, the left portions of the movable member 4 and cylindrical member 3 are provided with an electromagnetic force generating mechanism 20 for applying an axial driving force to the movable member 4 selectively in a non-contact manner. The electromagnetic force generating mechanism 20 has the same structure as a conventional one. The electromagnetic force generating mechanism 20 comprises an annular permanent magnet 21 magnetized in the radial direction, and a cylindrical coil 22. The annular permanent magnet 21 is fixed on the inner peripheral surface of an open end portion of the outer cylindrical portion 7. The cylindrical coil 22 is inserted in the cylindrical bore 6 in a non contact manner. The proximal end of the cylindrical coil 22 is fixed on the cylindrical member 3.

Figure 3:
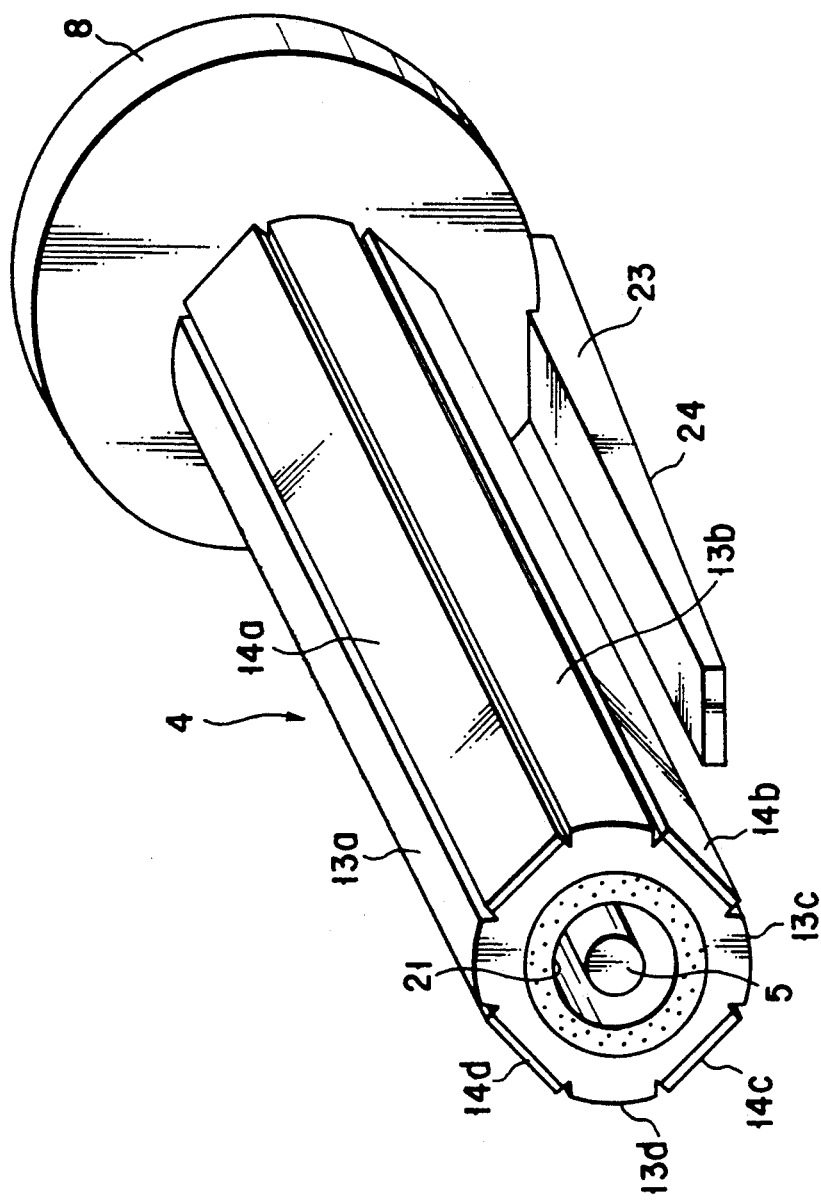
FIG. 3 is a perspective view of a movable member of the device according to the first embodiment.
Figure 4:
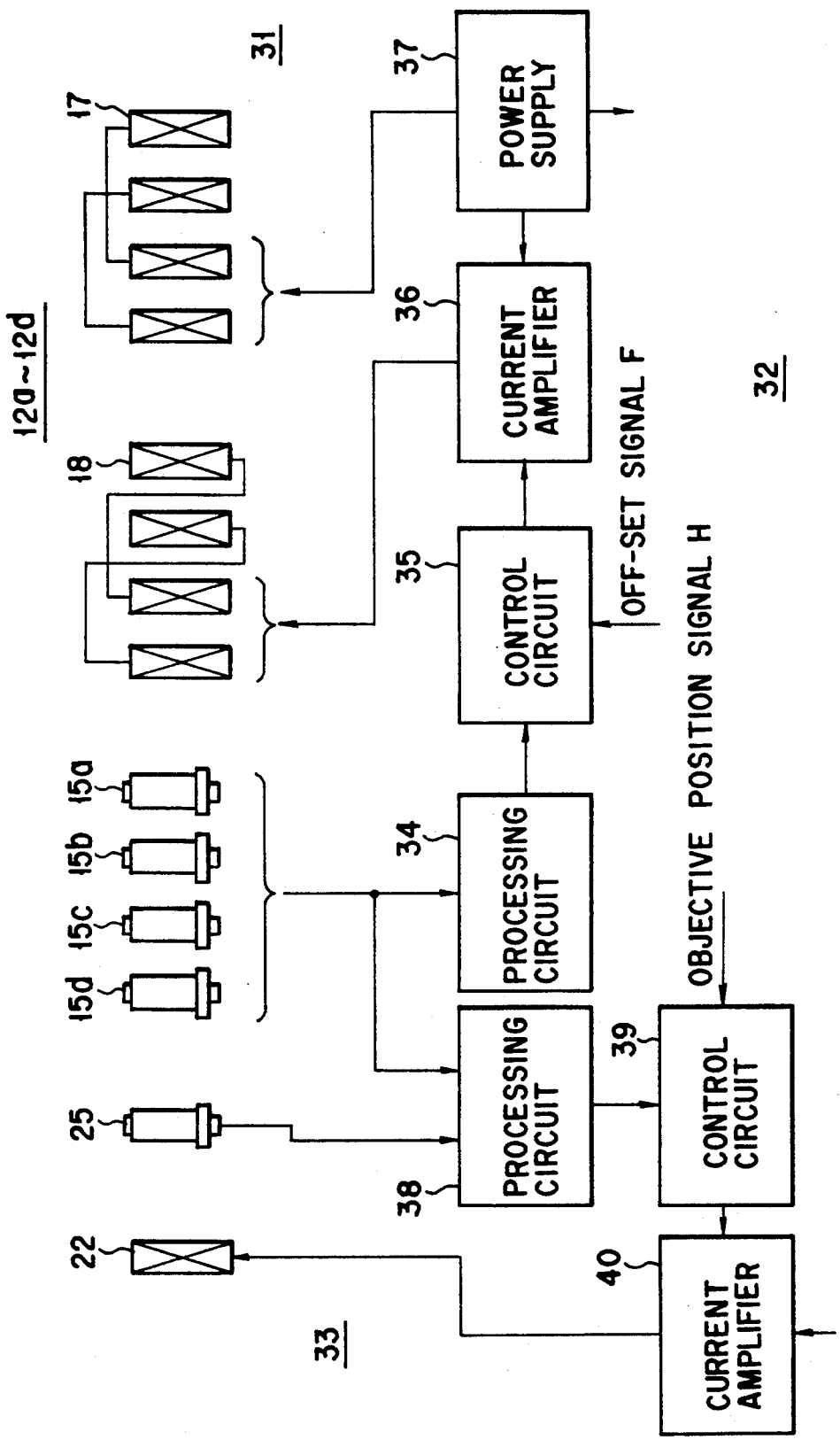
FIG. 4 is a block diagram of a controller of the device according to the first embodiment.

On the other hand, one end portion of an auxiliary plate 23 is fixed on the outer peripheral surface of the mirror support member 8. The auxiliary plate 23 extends along the axis of the movable member 4. The lower surface (in FIG. 1) of the auxiliary plate 23 is an inclined surface 24 inclined with respect to the axis of the movable member 4, as shown in FIG. 3. An axial position detector 25 for detecting the axial position of the movable member 4 is fixed on the stationary body 1. The axial position detector 25 has a measurement reference point, for example, at its tip portion. The axial position detector 25 detects the axial position of the movable member 4 on the basis of the distance between the measurement reference point and the inclined surface 24. A controller 31, as shown in FIG. 4, is connected to the axial position detector 25, cylindrical coil 22, bias coils and control coils of main components 10a and 10b of the magnetic bearing 10, and radial position detectors.

The inclined surface of the auxiliary plate 24 provided a circular-arc shape, defined about the axis of the movable member 4. On this structure, the positional detection has no influence of the axial rotational of the movable member 4.

The controller 31 comprises a magnetic bearing control unit 32 and an axial position control unit 33. FIG. 4 shows the magnetic bearing control unit 32 for activating the coils 12a to 12d of the main component 10a, but omits a control unit for activating the coils of the main component 10b.

The magnetic bearing control unit 32 will now be described. Outputs from the four radial position detectors 15a to 15d are input to a processing circuit 34. The processing circuit 34 converts the inputs to the amount of radial displacement. The amount of radial displacement is delivered to a control circuit 35. The control circuit 35 determines the operation amount on the basis of the difference between the amount of displacement and a reference position. A current amplifier 36 converts the operation amount to an electric current, and applies the current to the control coils 18 of the coils 12a to 12d. The bias coils of the coils 12a to 12d are supplied with a constant current from a power supply 37. The main component 10b is controlled similarly. By this control, the movable member 4 is levitated at a radial reference position in non-contact with the stationary body 1. In this embodiment, an off-set signal F is superimposed on the obtained operation amount, thereby setting the levitation position at a desired radial point.

On the other hand, the axial position control unit 33 will now be described. A processing circuit 38 receives an output from the axial position detector 25 and outputs from the radial position detectors 15a to 15d. On the basis of these outputs, the processing circuit 38 obtains a real axial position signal which does not contain an error component appearing in the output from the axial position detector 25 due to the radial position of the movable member 4. A control circuit 39 obtains a deviation between the obtained axial position signal and an objective position signal H. This deviation is converted to an electric current by a current amplifier 40, and the current is supplied to the cylindrical coil 22. By this control, the movable member 4 is moved and stopped at the objective position.

The apparatus having the above structure operates as follows. When the magnetic bearing 10 is activated, the bias coils 17 are excited by a constant current and the control coils 18 are excited by a current having a polarity corresponding to the direction of displacement and a level corresponding to the amount of radial displacement of the movable member 4. Specifically, the lengths of magnetic gaps between the magnetic pole faces of the yokes 11a to 11d and the magnetic pole faces of the projecting magnetic poles 13a to 13d are obtained on the basis of outputs from the radial position detectors 15a to 15d. Where the magnetic gap length is large, the control coil 18 is excited so as to increase the magnetic flux passing through this gap. On the other hand, where the magnetic gap length is small, the control coil 18 is excited so as to decrease the magnetic flux passing through the magnetic gap. Thus, the movable member 4 is supported by the magnetic bearing 10 in non-contact with the stationary body 1.

When the objective position signal H is applied, the electromagnetic force generating mechanism 20 is operated. According to the same principle as that of a conventional voice coil motor, the electromagnetic force generating mechanism 20 applies an axial driving force to the movable member 4 in a non-contact manner and stops the movable member 4 at an objective position. In this case, the axial position required for position control is found in a non-contact manner by the axial position detector 25 which detects the inclined surface 24 of the auxiliary plate 23. Thus, axial driving and positioning is performed in a perfect non-contact manner.

As has been described above, the movable member 4 for supporting an object is supported by the magnetic bearing 10 in non-contact with the stationary body 1. The axial position of the movable member 4 is detected by the combination of inclined surface 24 and axial position detector 25 in non-contact with the movable member 4. Further, the axial driving force is applied to the movable member 4 by the electromagnetic force generating mechanism 20 in non-contact with the movable member 4. Accordingly, the movable member 4 can be moved without friction, and no lubricant is required. Thus, the present apparatus can be used in a special environment for a long time. Since the movable member 4 can be moved without using a mechanical coupling feeding mechanism, there is no possibility of an erroneous element (e.g. backlash) in positioning, and precise positioning can be performed. Further, since the movable member 4 is axially moved and positioned by using the voice coil motor type electromagnetic force generating mechanism 20, the movable member 4 can be moved over a long distance and positioned with high precision. Accordingly, the present apparatus is capable of long-distance, high-precision positioning for a long time in a special environment, for example, in a vacuum.

The above embodiment has the following advantages, too. In general, in order to control the magnetic bearing 10, it is necessary to detect the radial position of the movable member 4 by some means. In this case, according to this embodiment, the flat faces 14a to 14d are formed on the outer peripheral surface of the movable member 4 and between the projecting magnetic poles 13a to 13d. The flat faces 14a to 14d are used as radial position detecting faces. Since the flat faces 14a to 14d are displaced from the projecting magnetic poles 13a to 13d in the circumferential direction, processing of the flat faces 14a to 14d is easy. In addition, since the flat faces 14a to 14d are displaced from the projecting magnetic poles 13a to 13d in the circumferential direction, the flat faces 14a to 14d are not damaged even when the movable member 4 comes in contact with the cylindrical member 3, and the reliability of the apparatus can be enhanced. Furthermore, since the magnetic pole faces of the yokes 11a to 11d and the magnetic pole faces of the projecting magnetic poles 13a to 13d provided on the movable member 4 have arcuated cylindrical shapes, defined about the axis of the movable member 4, the magnetic resistance between the pole faces of the yokes, on the one hand, and the pole faces of the poles 13a to 13d, on the other hand, can be stabilized. Even if a torque is applied to the movable member 4, the movable member 4 is automatically restored to its original position. In addition, since the external off-set signal F can be applied to the magnetic bearing control unit 32, the position or attitude of the movable body 4 can be varied.

Figure 5:
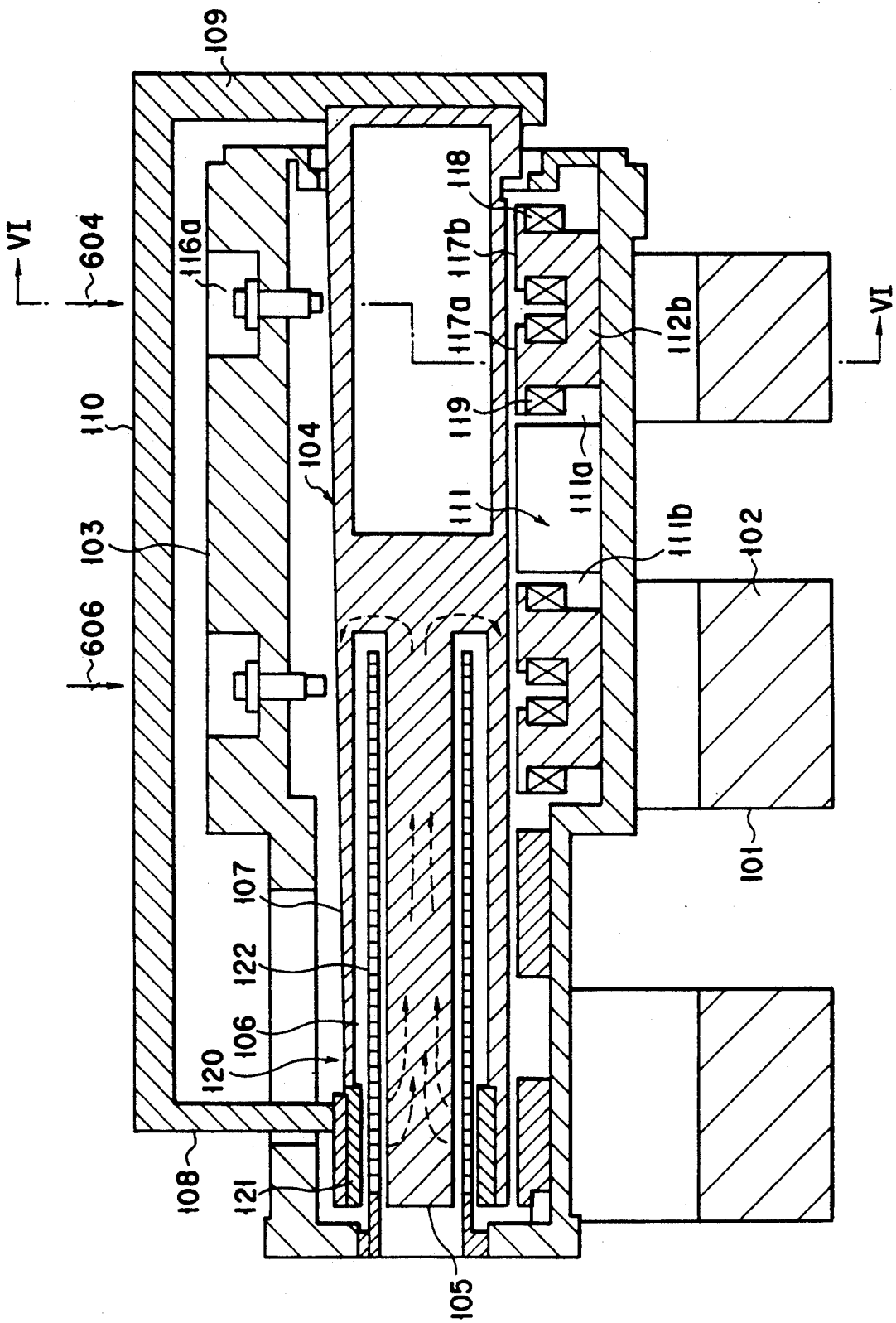
FIG. 5 is a cross-sectional view of a linear movement/support device according to a second embodiment of the present invention.
Figure 6:
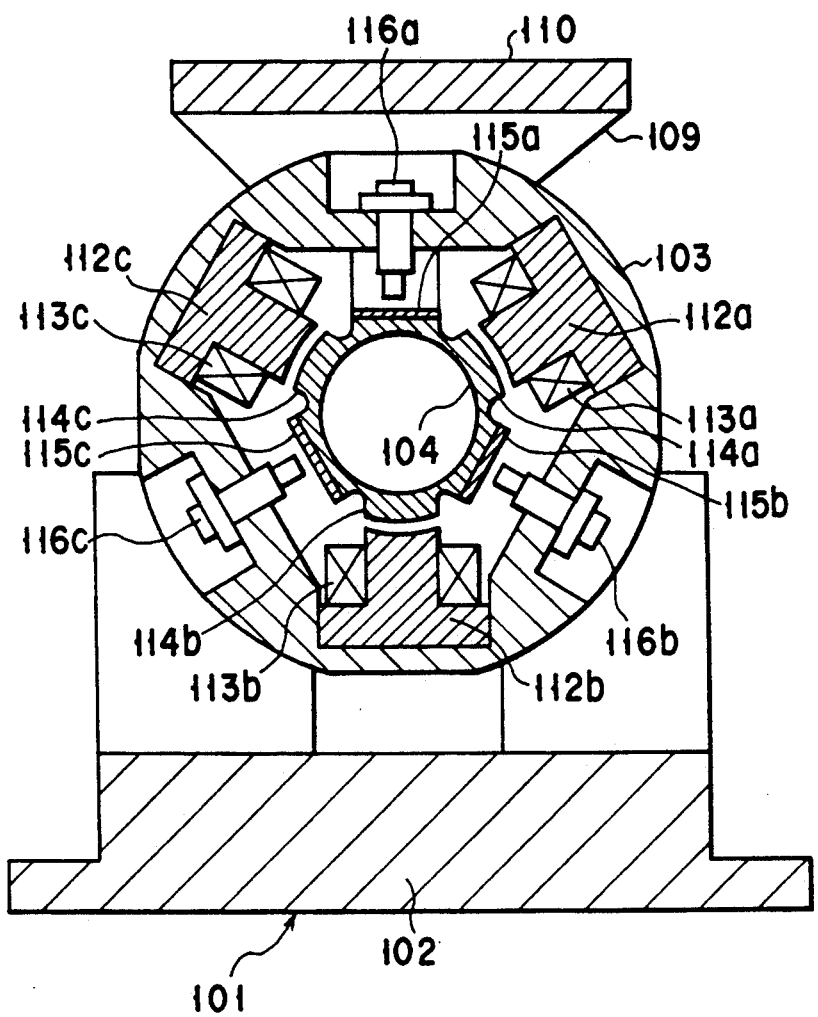
FIG. 6 is a cross-sectional view of the device according to the second embodiment, taken along line VI—VI in FIG. 5, as viewed in the direction of arrows.

FIGS. 5 and 6 show a linear movement/support device for supporting a precision linear table, according to a second embodiment of the invention. FIG. 5 is a cross-sectional view showing schematically the linear movement/support device.

In these figures, a stationary body 101 comprises a base 102 and a non-magnetic cylindrical member 103 fixed on the base 102. A substantially columnar movable member 104 is situated within the cylindrical member 103 so as to be movable along the axis of the cylindrical member 103.

The movable member 104 is formed of a magnetic material. An almost right half portion of the movable member 104 (in FIG. 5) is hollow, and an almost left half portion thereof is constructed such that a center rod portion 105, a cylindrical bore 106 and an outer cylindrical portion 107 are concentrically arranged. Both end portions of the movable member 104 are coupled to a table 110 via coupling portions 108 and 109.

The movable member 104 and cylindrical member 103 are provided with main components 111a and 111 of a magnetic bearing 111 for supporting the movable member 104 in non-contact with the cylindrical member 103. Specifically, the main components 111a and 111 of the magnetic bearing 111 are provided at two axial positions of the cylindrical member 103 and movable member 104, i.e. points indicated by arrows 604 and 606 in FIG. 5.

The magnetic bearing 111 is of attraction support type. FIG. 6 shows representatively the main component 111a (indicated by arrow 604) of main components 111a and 111. Specifically, the main component 111a comprises yokes 112a, 112b and 112c, which are fixed on the inner surface of the cylindrical member 103 at angular intervals of 120° in the circumferential direction such that the magnetic pole faces of the yokes are directed to the axis of the cylindrical member 103; coils 113a, 113b and 113c mounted on the yokes; projecting magnetic poles 114a, 114b and 114c provided on the outer peripheral surface of the movable member 104 at intervals of 120° in the circumferential direction and extending substantially over the entire length of the movable member 104; inclined faces 115a, 115b and 115c used for axial position detection, the inclined faces 115a, 115b and 115c extending substantially over the entire length of the movable member 104 between the projecting magnetic poles and being inclined with respect to the axis of the movable member 104; and radial position detectors 116a, 116b and 116c, fixed on the cylindrical member 103 between the yokes, for detecting the distance between the detectors 116a, 116b and 116c and the inclined faces.

FIG. 5 shows representatively the yoke 112c of the yokes 112a, 112b and 112c. The yoke 112c has two magnetic pole faces 117a and 117b and is fixed on the inner surface of the cylindrical member 103 such that these two magnetic pole faces 117a and 117b are axially arranged. The coils 113a, 113b and 113c mounted on the yokes 112a, 112b and 112c comprise bias coils 118 and control coils 119.

The two magnetic pole faces 117a and 117b of each of the yokes 112a, 112b and 112c and the magnetic pole faces of the three projecting magnetic poles 114a, 114b and 114c provided on the movable member 104 have arcuated cylindrical shapes, defined about the axis of the movable member 104, so as to stabilize the magnetic resistance between the pole faces 117a and 117b of each yoke, on the one hand, and the pole faces of the poles 114a, 114b and 114c, on the other hand. The other main component 111 has the same structure as the main component 111a.

As is shown in FIG. 5, the left portions of the movable member 104 and cylindrical member 103 are provided with an electromagnetic force generating mechanism 120 for applying an axial driving force to the movable member 104 selectively in a non-contact manner. Like a conventional voice coil motor, the electromagnetic force generating mechanism 120 comprises an annular permanent magnet 121 magnetized in the radial direction and fixed on the inner peripheral surface of an open end portion of the outer peripheral portion 107, and a cylindrical coil 122 inserted in the cylindrical bore 106 in a non-contact manner. The proximal end of the cylindrical coil 122 is fixed on the cylindrical member 103.

A controller (not shown) is connected to the cylindrical coil 122, bias coils and control coils of main components 111a and 111 of the magnetic bearing 111, and position detectors 116a, 116b and 116c.

The controller comprises, like the first embodiment, a magnetic bearing control unit and an axial position control unit. The magnetic bearing control unit has basically the same structure as that of the magnetic bearing control unit employed in the first embodiment. For example, in the case of the main component 111a, the amount of displacement of the movable member 104 from the reference position is calculated on the basis of the outputs from the three position detectors 116a, 116b and 116c. The current to the control coil 119 is controlled so as to reduce the amount of displacement to zero. By this control, the movable member 104 is levitated at the radial reference position in non-contact with the stationary body 101. In this embodiment, too, an off-set signal F is superimposed on the obtained operation amount, thereby setting the levitation position at a desired radial point.

On the other hand, in the axial position control unit 33, an axial position signal relating to the axial position of the movable member 104 is obtained from the outputs from the position detectors 116a, 116b and 116c. A deviation between the obtained axial position signal and an objective position signal is converted to an electric current through a current amplifier, and the current is supplied to the cylindrical coil 122. Accordingly, in this embodiment, the detection of both radial position and axial position of the movable member 104 is simultaneously performed by the combination of the inclined surfaces 115a, 115b and 115c of the movable member 104 and the position detectors 116a, 116b and 116c.

With the above structure, too, the same advantages as in the first embodiment can be obtained. In this embodiment, since the inclined surfaces 115a, 115b and 115c are used for both radial position detection and axial position detection, the entire structure can be simplified and the number of detectors can be reduced to a minimum.

In the above embodiment, bias coils are built in the magnetic bearing. However, the bias coils may be replaced by permanent magnets. In addition, in the above embodiment, the means for detecting the axial position of the movable member is constituted such that the inclined surface is formed on the movable member side and the detector is provided on the stationary body, and the distance between the inclined surface and the detector is detected by the detector. However, the means for detecting the axial position of the movable member is not limited to this construction. For example, a code scale may be formed on the movable member and optically scanned. Any structure is available if it can detect the axial position of the movable member in a non-contact manner. Further, in each of the above embodiments, two main components of the magnetic bearing are arranged in the axial direction. The number of main components of the magnetic bearing, however, may be three or more.

A linear movement/support device according to a third embodiment of the invention will now be described with reference to FIGS. 7 to 14. The mechanical components of the device of the third embodiment are similar to those of the device of the first embodiment, but the control components of the device of the third embodiment differ from those of the device of the first embodiment or second embodiment.

Figure 7:
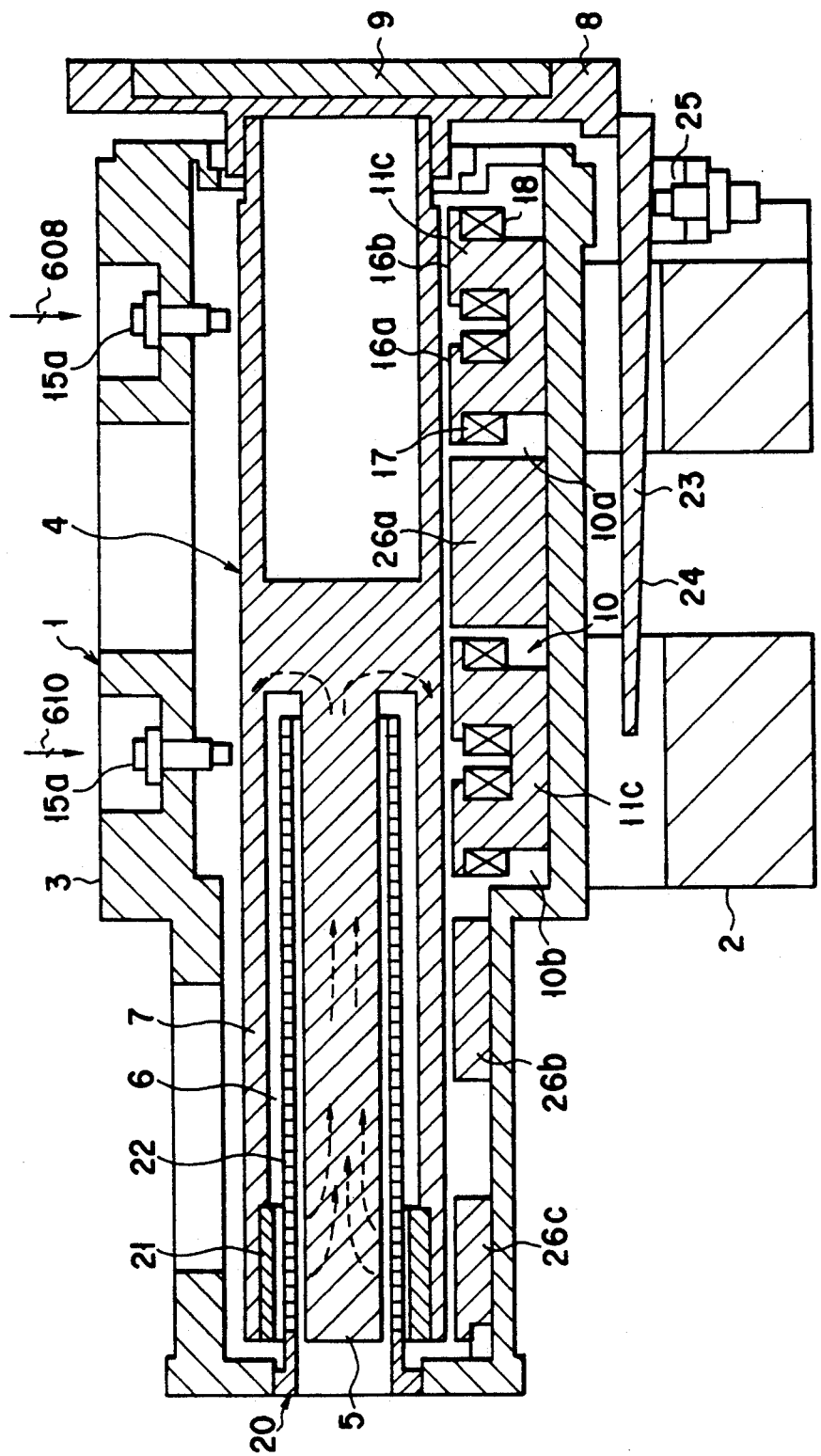
FIG. 7 is a cross-sectional view showing a linear movement/support device according to a third embodiment of the invention, in a similar manner with FIG. 1.

In FIG. 7, the same elements as in FIG. 1 are denoted by like reference numerals and description thereof is omitted. A touchdown bearing 26a is provided between the main components 10a and 10b, and touchdown bearings 26b and 26c are provided on the left portion (in FIG. 7) of the stationary body 1. Thereby, collision between the yokes 11a to 11d and projecting magnetic poles 13a to 13d can be prevented when the movable member 4 is not magnetically levitated.

Figure 8:
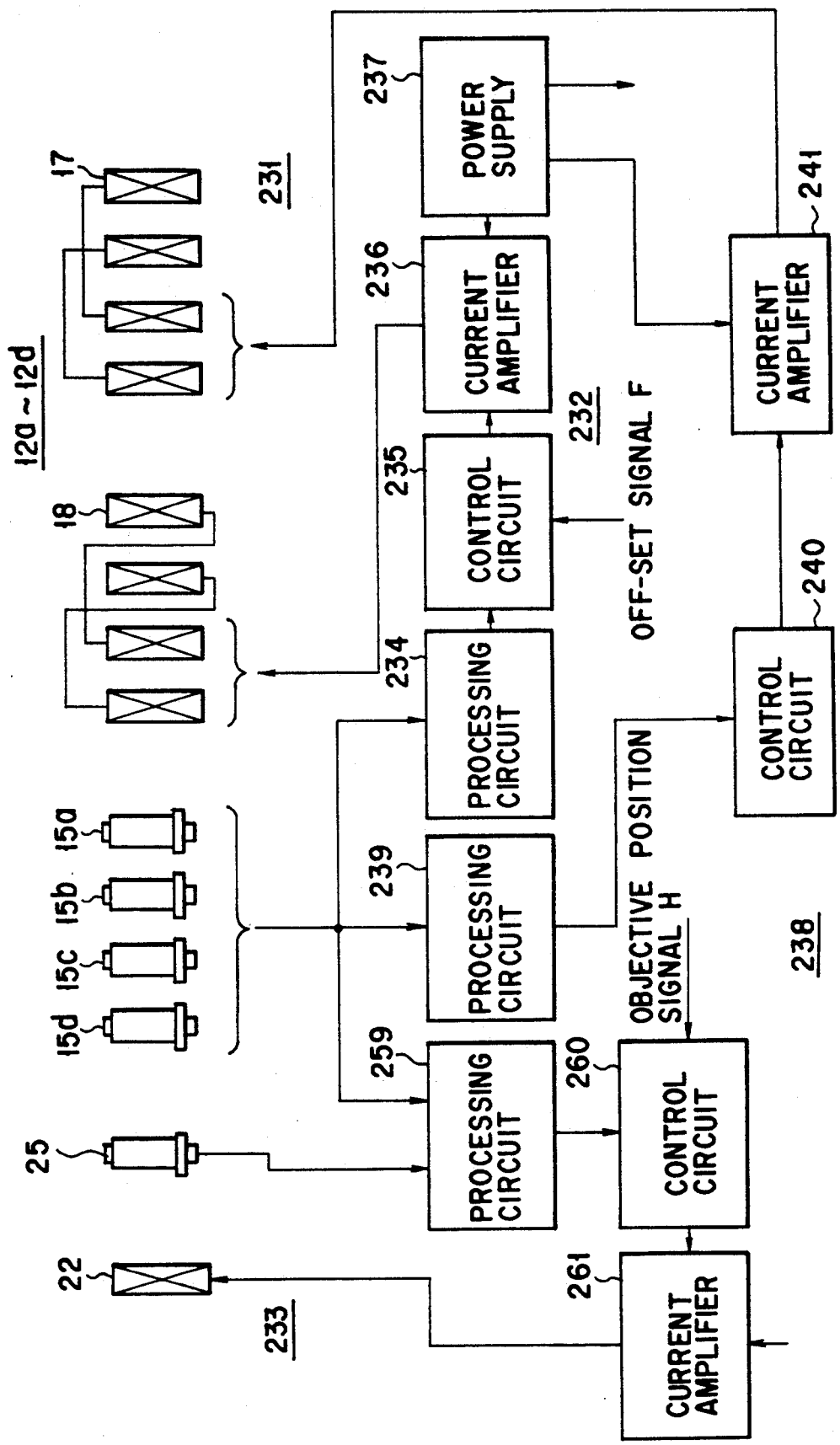
FIG. 8 is a block diagram of a controller of the device according to the third embodiment.

A controller 231 comprises a magnetic bearing control unit 232 and an axial position control unit 233. FIG. 8 shows the magnetic bearing control unit 232 for activating the coils 12a to 12d of the main component 10a, but it does not show the control unit for activating the coils of the main component 10b.

The magnetic bearing control unit 232 will now be described. A processing circuit 234 receives outputs of four radial position detectors 15a to 15d and converts the outputs to a radial displacement amount. The position detectors 15a to 15d are arranged in positions indicated by arrows in FIG. 10, in relation to the movable member 4. The outputs from the position detectors 15a to 15d are denoted by S1, S2, S3 and S4, and similarly the outputs from the position detectors 15a to 15d arranged in positions indicated by arrows 610 are denoted by S5, S6, S7 and S8. In this case, X-axis and Y-axis displacement amounts X1, Y1, X2 and Y2 of the movable member 4, at points indicated by arrows 608 and 610, are given by $$X1 = \{(S1 + S4) - (S2 + S3)\}/2\sqrt{2}$$
$$X2 = \{(S5 + S8) - (S6 + S7)\}/2\sqrt{2}$$

$$Y1 = \{(S1 + S2) - (S3 + S4)\}/2\sqrt{2}$$
$$Y2 = \{(S5 + S6) - (S7 + S8)\}/2\sqrt{2}$$

The processing circuit 234 obtains displacement amounts X1 and Y1 (X2 and Y2).

These displacements are delivered to a control circuit 235, and operation amounts are determined based on differences between the displacement amounts and reference position values. The operation amounts are converted to electric currents by a current amplifier 236, and the currents are applied to the control coils 18 of the coils 12a to 12d. The amplifier 236 is supplied a power from a power supply 237.

The outputs from the position detectors 15a to 15d are supplied to a processing circuit 239 of a vibration damping control unit 238. Based on the output from the position detectors 15a to 15d, the processing circuit 239 produces a signal representing a rotational displacement amount and outputs the rotational displacement amount signal to a control circuit 240. The control circuit 240 determines the magnitude and timing of control current applied to the bias coils 17 on the basis of the rotational displacement amount signal input to the control circuit 240, and delivers a signal representing the magnitude and timing of the control current to a current amplifier 241. An output from the current amplifier 241 is applied to the bias coils 17.

Figure 9:
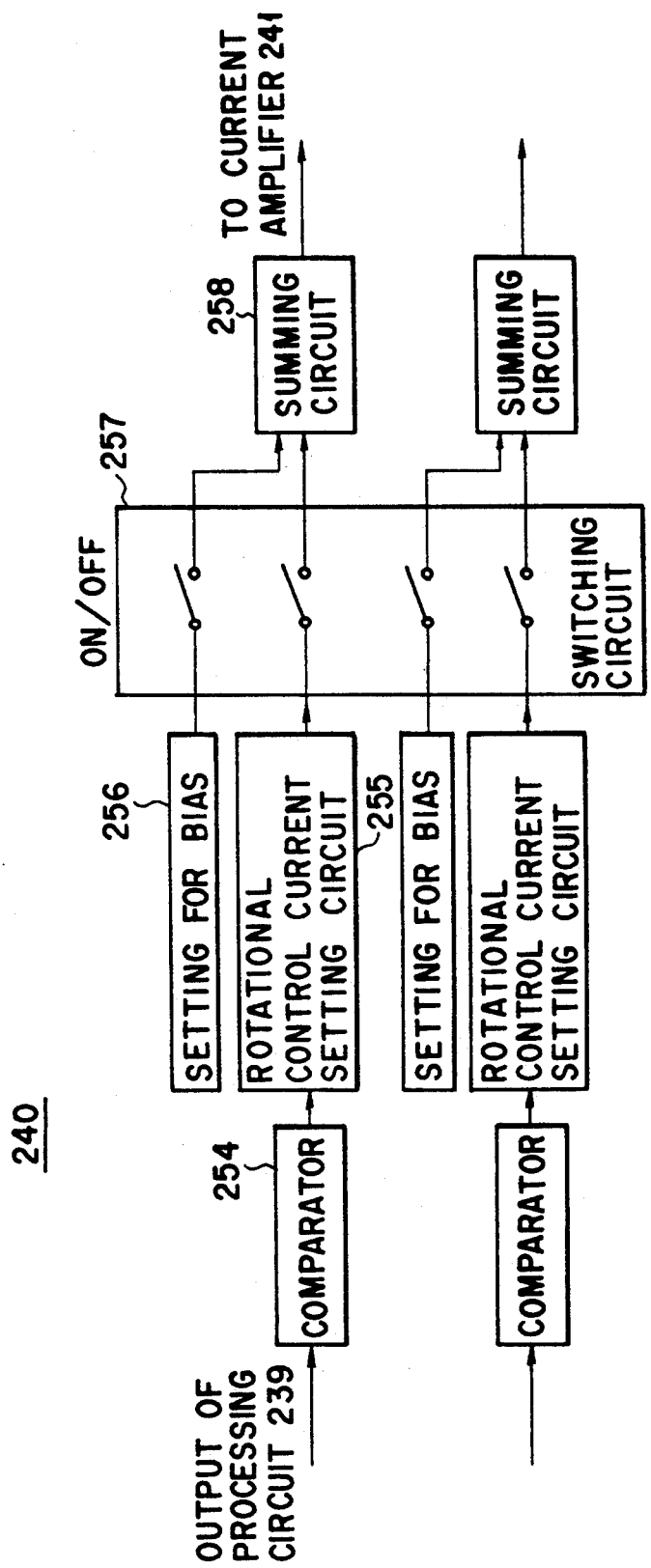
FIG. 9 is a block diagram of a vibration damping controller in the controller of the device according to the third embodiment.
Figure 10:
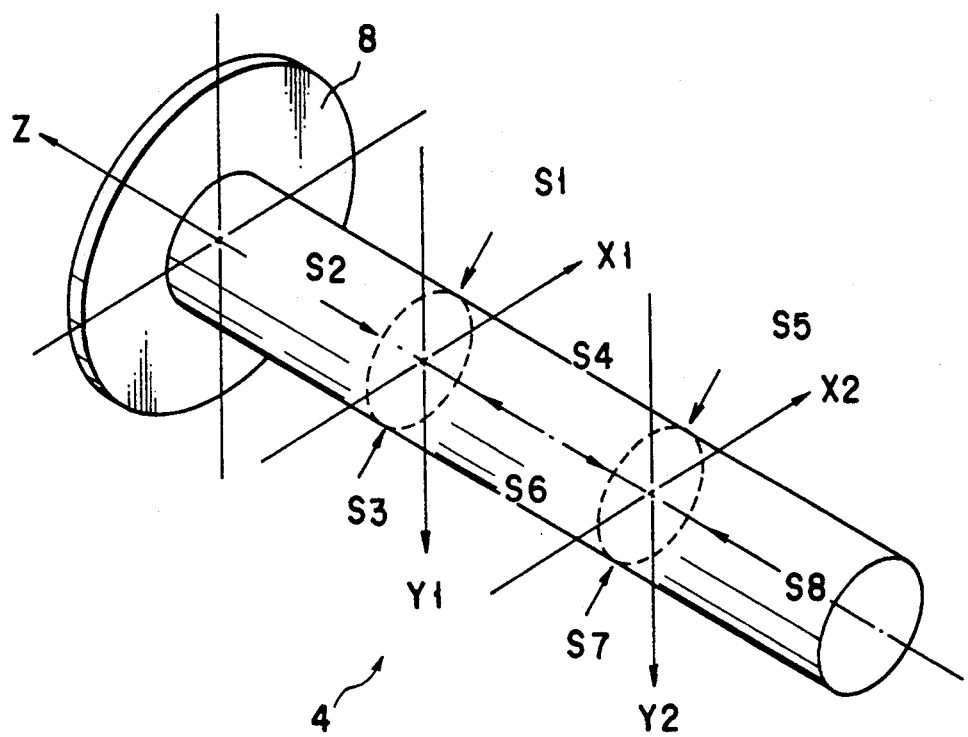
FIG. 10 is a view for explaining the principle of the radial displacement detection in the third embodiment.

FIG. 9 shows the configuration of the control circuit 240. In FIG. 9, two channel outputs are supplied from the processing circuit 239. The control circuit 240 comprises comparator 254, rotational control current setting circuits 255, bias setting circuits 256, a switching circuit 257, and summing circuits 258. The comparator 254 monitors the change of a rotational displacement signal output from the processing circuit 239 and, when the change of the rotational displacement signal, i.e. the signal slope of the rotational displacement signal is a positive number, applies the rotational displacement signal to the rotational control current setting circuit 255. The rotational control current setting circuit 255 determines a rotational control current applied to the bias coils 17. The rotational control current has the value and timing corresponding to the level and variation of the rotational displacement signal. The bias setting circuit 256 sets a current value of an electric current supplied constantly to the bias coils. The switching circuit 257 switches the outputs from the bias setting circuit 256 and rotational control current setting circuit 255. The switching circuit 257 is turned on/off on an as-needed basis. The summing circuit 258 sums the bias current signal output from the bias setting circuit 256 and the control current signal output from the rotational control current setting circuit 255, and delivers the summed signal to the current amplifier 241. The excitation currents of the bias coils 17 are controlled by the output from the current amplifier 241.

On the other hand, the axial position control unit 233 will now be described. A processing circuit 259 receives an output from the axial position detector 25 and outputs from the position detectors 15a to 15d. On the basis of these outputs, the processing circuit 259 obtains a real axial position signal which does not contain an error component appearing in the output from the axial position detector 25 due to the radial position of the movable member 4. A control circuit 260 obtains a deviation between the obtained axial position signal and an objective position signal H. This deviation is converted to an electric current by a current amplifier 261, and the current is supplied to the cylindrical coil 22. By this control, the movable member 4 is moved and stopped at the objective position.

The apparatus having the above structure operates as follows. When the magnetic bearing 10 is activated, the bias coils 17 are excited and the control coils 18 are excited by a current having a polarity corresponding to the direction of displacement and a level corresponding to the amount of radial displacement of the movable member 4. Specifically, the lengths of magnetic gaps between the magnetic pole faces of the yokes 11a to 11d and the magnetic pole faces of the projecting magnetic poles 13a to 13d are obtained on the basis of outputs from the radial position detectors 15a to 15d. Where the magnetic gap length is large, the control coil 18 is excited so as to increase the magnetic flux passing through this gap. On the other hand, where the magnetic gap length is small, the control coil 18 is excited so as to decrease the magnetic flux passing through the magnetic gap. Thus, the movable member 4 is supported by the magnetic bearing 10 in non-contact with the stationary body 1. In this embodiment, an offset signal F is applied to a control circuit 235, thereby varying the radial stable position of the movable member 4.

When the objective position signal H is applied, the electromagnetic force generating mechanism 20 is operated. According to the same principle as that of a conventional voice coil motor, the electromagnetic force generating mechanism 20 applies an axial driving force to the movable member 4 in a non-contact manner and stops the movable member 4 at an objective position. In this case, the axial position required for position control is found in a non-contact manner by the axial position detector 25 which detects the inclined surface 24 of the auxiliary plate 23. Thus, axial driving and positioning is performed in a perfect non-contact manner.

When an external circumferential force is applied to the movable member 4 during operation and the movable member 4 vibrates about its axis, the following control is performed. Specifically, when a circumferential force is applied to the movable member 4, outputs from the position detectors 15a to 15d are converted to rotational displacement amounts by the processing circuit 239 of the vibration damping control unit 238.

As is shown in FIG. 7, when a rotational force is applied to the movable member 4 and the movable member 4 is rotated about its axis over an angle $\theta$, the outputs from the position detectors 15a to 15d vary.

The output of the position detector 15a is d0 when the movable member 4 is not rotated. When the movable member 4 is rotated by $\theta$ and the flat face 14a of the movable member 4 is inclined, the right end of the flat face 14a becomes closer to the position detector 15a, than the left end of the flat face 14a, in the detection area of the position detector 15a, with the result that the output from the position detector 15a decreases. When the variation of the output of the position detector 15a is $\delta d$, the output d1 of the position detector 15a is given by $$d1 = d0 - \delta d$$

Similarly, the output d3 of the position detector 15c situated diametrically opposite to the position detector 15a is given by $$d3 = d0 - \delta d$$

The sum d13 of these outputs is $$d13 = 2d0 - 2\delta d$$

In the above embodiment, when the rotational displacement is zero, the output of the position detectors 15a and 15c is d0. However, since the position of the shown movable member 4 is a nominal position in the case where the movable member 4 is normally magnetically levitated, this value d0 is adjusted to zero. Accordingly, $$d13 = -2\delta d$$

and only the value resulting from the rotation is output. Thus, the sum $d\theta 1$ of the outputs of the four position detectors 15a to 15d at the position indicated by arrow 608 is given by $$d\theta 1 = -4\delta d$$

Similarly, the sum $d\theta 2$ of the outputs of the position detectors 15a to 15d at positions indicated by arrow 610 (in FIG. 7) is given by $$d\theta 2 = -4\delta d$$

Even if these sums are summed, only the value resulting from the rotation can be detected. This sum $d\theta$ is given by $$d\theta = -8\delta d.$$

All values d13, $d\theta 1$, $d\theta 2$ and $d\theta$ are values resulting from the rotation. Normally, $\delta d$ is a small value. Thus, it is preferable to adopt $d\theta$ with a greater S/N as the value resulting from the rotation. In this embodiment, the processing circuit 239 finds the rotational displacement amount on the basis of $d\theta$.

The obtained rotational displacement signal is input to the comparator 254 of the control circuit 240. Only when the gradient of the rotational displacement signal is a positive value, is the rotational control current is set in the rotational control current setting circuit 255. The set rotational control current signal is input to the summing circuit 258 via the switching circuit 257.

Figure 12:
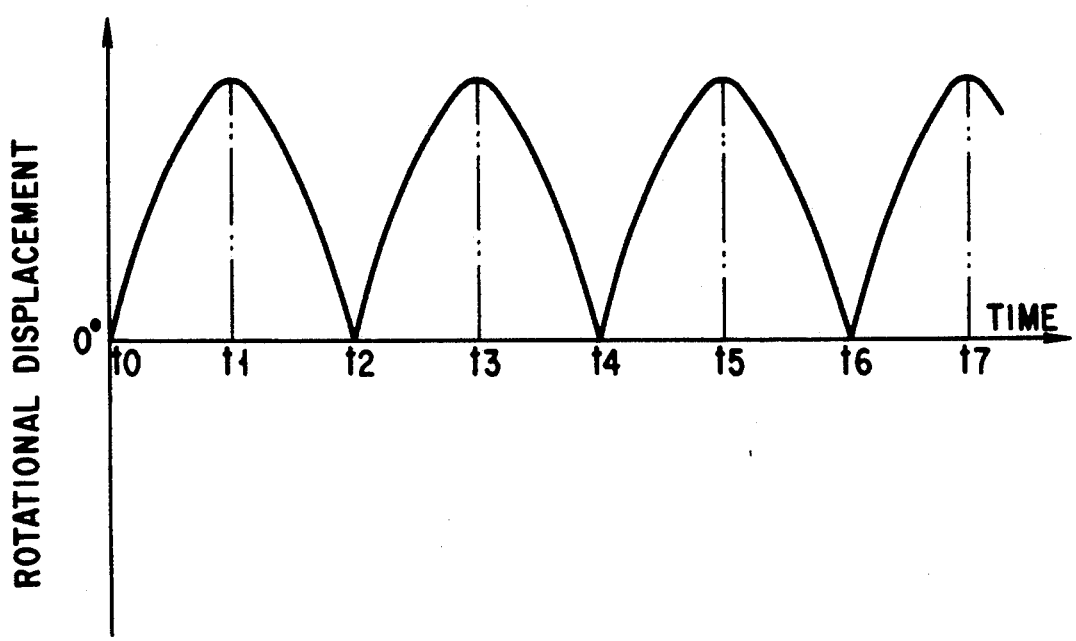
FIG. 12 is a graph showing the amount of rotational displacement with the passing of time according to the third embodiment.
Figure 13:
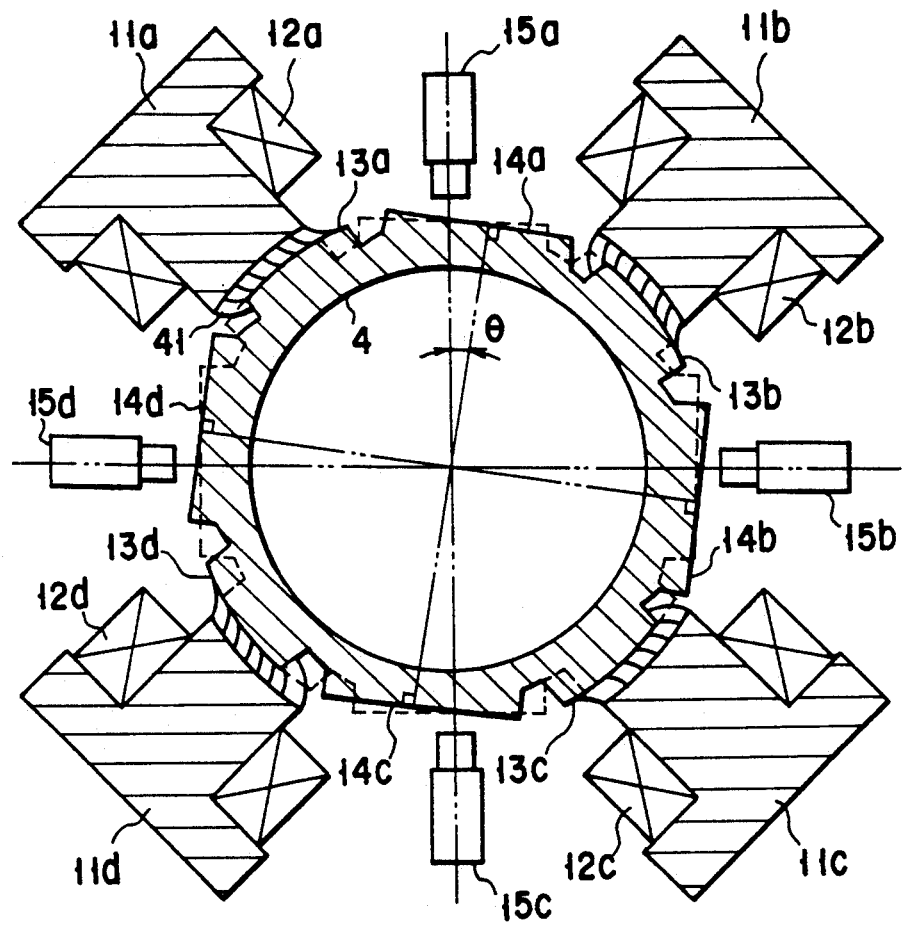
FIG. 13 is a view for explaining the control for damping a vibration about the axis of the movable member according to the device of the third embodiment.

The rotational displacement amount of the movable member 4 takes values, as shown in FIG. 12. In this embodiment, the output from the rotational control current setting circuit 255 is delivered to the summing circuit 258 via the switching circuit 257 only in periods (indicated by thick lines in FIG. 12) in which the absolute values of the rotational displacement signal, which has passed through the comparator 254, increase. The rotational control current signal superimposed on the bias current signal in the summing circuit 258 is converted to electric current by the current amplifier 241 and this current is supplied to the bias coils 17. Thus, only when the rotational displacement amount of the movable member 4 increases, does the current flowing through the bias coils 17 increase. As a result, in the above-mentioned periods, the magnetic attraction force acting between the magnetic pole faces of the yokes 11a to 11d and the projecting magnetic poles 13a to 13d increases, and a force acts to restore the movable member 4 to its original position, as shown in FIG. 13. This force cancels the external rotational energy, and the vibration of the movable member 4 is quickly damped As has been described above, the control current is applied to the bias coils 17 commonly on the basis of the magnitude and time-based variation of the rotational displacement amount, thereby effectively damping the vibration of the movable member 4 about its axis.

The structures of the processing circuit 239, comparators 254, rotational control current setting circuits 255, bias setting circuits 256, switching circuit 257 and summing circuits 258, which constitute the vibration damping control unit 238, are not complex. These circuits may be constituted by analog circuits by using some operational amplifiers, some resistors and capacitors. Even where these circuits are constituted by digital circuits, the circuits can be constituted by A/D converters, D/A converters, interfaces, programs of 20-80 steps (depending on computer languages), etc. Thus, compared to the case of using a vibration damping control device having a rotational displacement detector and an actuator, the weight of the entire apparatus can be reduced and the reliability of the apparatus enhanced.

FIG. 14 shows a control circuit 240a which is a modification of the control circuit 240. In this modification, the comparators 254 and rotational control current setting circuits 255 shown in FIG. 9 are replaced by other circuits Specifically, a signal output from the processing circuit 239 is input to a phase compensation circuit 270. An output from the phase compensation circuit 270 is input to a control gain setting circuit 271. An output from the control gain setting circuit 271 is input to a rectifier circuit 272, and an output from the rectifier circuit 272 is delivered to the current amplifier 241.

In the control circuit 240a, the rotational displacement signal slope output from the processing circuit 239 is not judged. In the control circuit 240a, the phase compensation circuit 270 directly performs PID control, the control gain setting circuit 271 sets control current, and the rectifier circuit 272 performs rectification. Thus, electric current is applied to the bias coils 17. With this structure, the same advantages as in the embodiment of FIG. 8 can be obtained. If the output of the processing circuit 239 is always positive, the rectifier circuit 272 of the control circuit 240a is not needed.

In the control circuit 240a having the above structure, the structures of electric circuits are simple. Thus, the weight of the entire apparatus can be reduced, and the reliability of the apparatus enhanced.

A linear movement/support device according to a fourth embodiment of the invention will now be described with reference to FIGS. 15 to 19. The mechanical components of the device of the fourth embodiment are similar to those of the device of the first embodiment, but the control components of the device of the fourth embodiment differ from those of the devices of the first to third embodiments.

Figure 15:
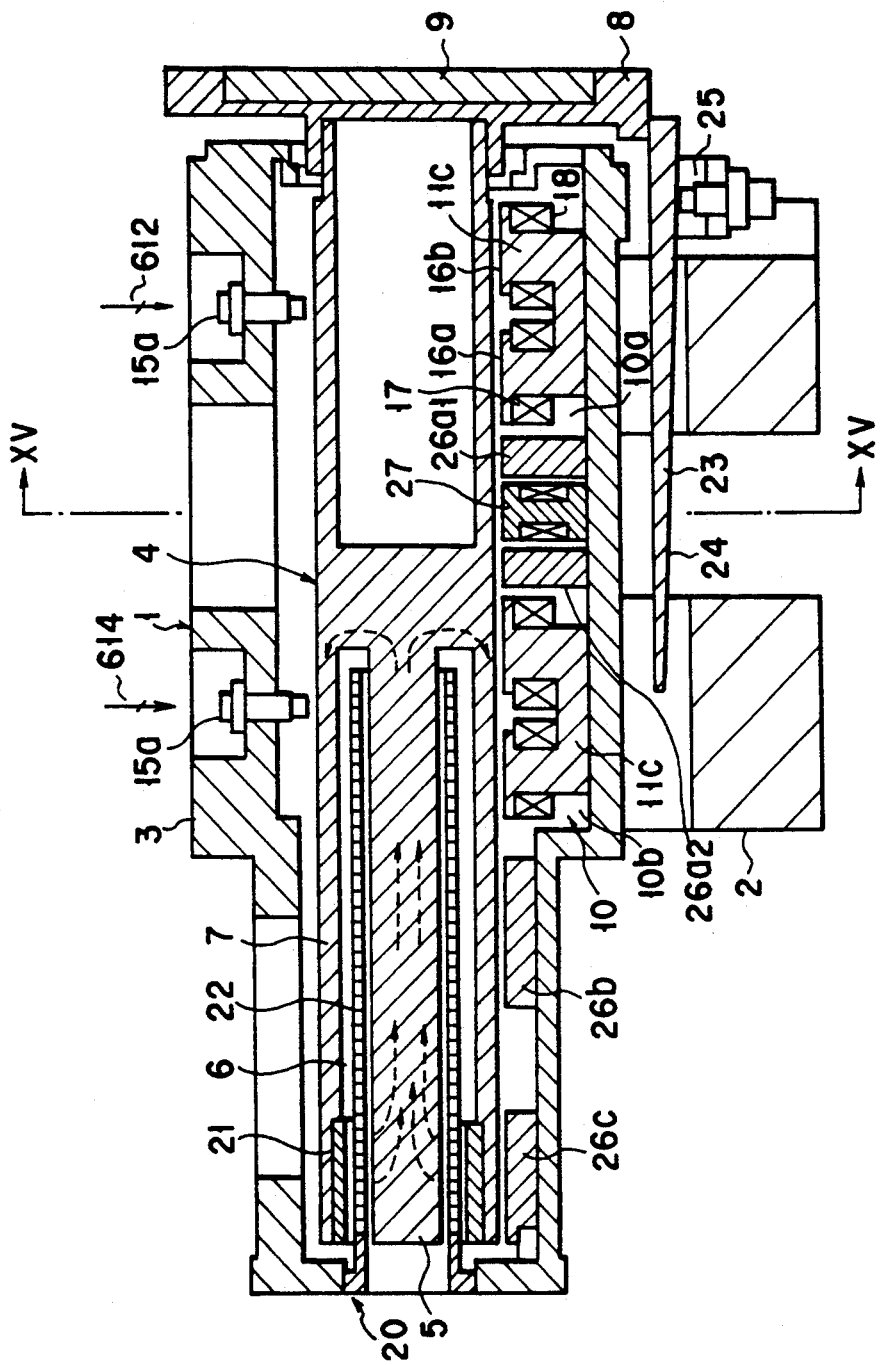
FIG. 15 is a cross-sectional view showing a linear movement/support device according to a fourth embodiment of the invention, in a similar manner with FIG. 1.

In FIG. 15, the same elements as in FIG. 1 are denoted by like reference numerals and description thereof is omitted. A touchdown bearing 26a (26a1 and 26a2) is provided between the main components 10a and 10b, and touchdown bearings 26b and 26c are provided on the left portion (in FIG. 1) of the stationary body 1. Thereby, collision between the yokes 11a to 11d and projecting magnetic poles 13a to 13d can be prevented when the movable member 4 is not magnetically levitated.

An end portion of the auxiliary plate 23 is fixed on the outer peripheral surface of the mirror support member 8. The auxiliary plate 23 is arranged to extend along the axis of the movable member 4. The lower surface (in FIG. 1) of the auxiliary plate 23 is the inclined surface 24 inclined with respect to the axis of the movable member 4, as shown in FIG. 3. The axial position detector 25 is fixed on the stationary body 1. The detector 25 detects the axial position of the movable member 4 in a non-contact manner on the basis of the distance between the detector 25 and the inclined surface 24.

Figure 16:
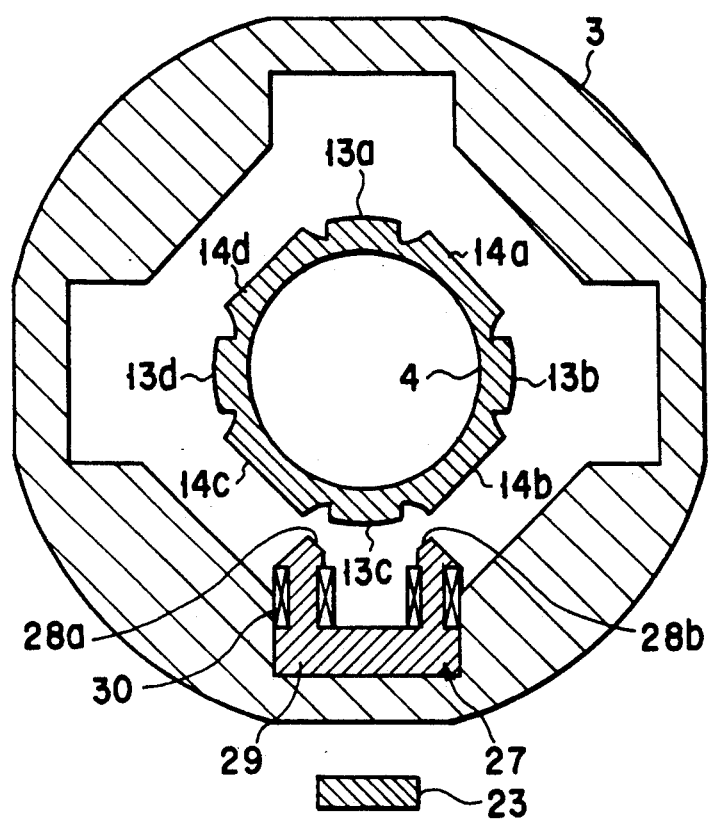
FIG. 16 is a cross-sectional view of the device according to the fourth embodiment, taken along line XV—XV in FIG. 15, as viewed in the direction of arrows.

An electromagnet 27 for rotation control is provided between the touchdown bearings 26a1 and 26a2. The electromagnet 27 comprises, as shown in FIG. 16, a yoke 29 with both magnetic pole faces 28a and 28b opposed to both circumferential end portions of the projecting magnetic pole 13c, and a control coil 30 wound around the yoke 29. The axial position detector 25, cylindrical coil 22 and the elements (bias coils, control coils, position detectors and control coil 30) of the main components 10a and 10b of the magnetic bearing 10 are connected to a controller 331 shown in FIG. 17.

Figure 17:
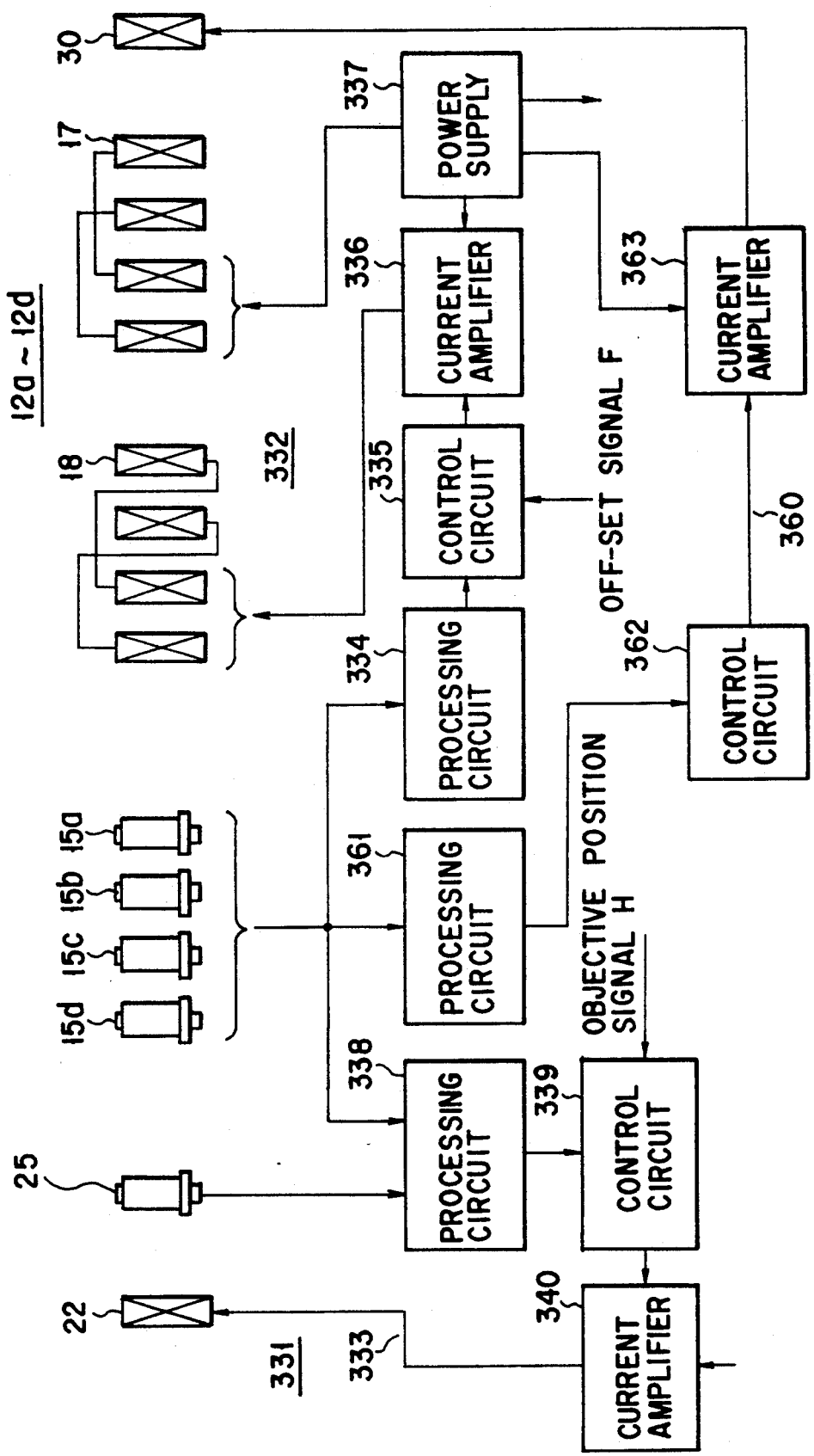
FIG. 17 is a block diagram of a controller of the device according to the fourth embodiment.

The controller 331 comprises a magnetic bearing control unit 332, an axial position control unit 333, and a vibration damping control unit 360. FIG. 17 shows the magnetic bearing control unit 332 for activating the coils 12a to 12d of the main component 10a, but it does not show the control unit for activating the coils of the main component 10b.

In the magnetic bearing control unit 332, outputs from the four radial position detectors 15a to 15d are delivered to a processing circuit 334 and converted to a radial displacement amount. The position detectors 15a to 15d are arranged in positions indicated by arrows in FIG. 10, in relation to the movable member 4. The outputs from the position detectors 15a to 15d are denoted by S1, S2, S3 and S4, and similarly the outputs from the position detectors 15a to 15d arranged in positions indicated by arrows 614 are denoted by S5, S6, S7 and S8. In this case, X-axis and Y-axis displacement amounts X1, Y1, X2 and Y2 of the movable member 4, at points indicated by arrows 612 and 614, are given by $$X1 = \{(S1 + S4) - (S2 + S3)\}/2\sqrt{2}$$
$$X2 = \{(S5 + S8) - (S6 + S7)\}/2\sqrt{2}$$
$$Y1 = \{(S1 + S2) - (S3 + S4)\}/2\sqrt{2}$$
$$Y2 = \{(S5 + S6) - (S7 + S8)\}/2\sqrt{2}$$

These displacements are delivered to a control circuit 335, and operation amounts are determined based on differences between the displacement amounts and reference position values. The operation amounts are converted to electric currents by a current amplifier 336, and the currents are applied to the control coils 18 of the coils 12a to 12d. An input terminal of the current amplifier 336 is connected to a power supply 337.

On the other hand, in the axial position control unit 333, a processing circuit 338 receives an output from the axial position detector 25 and outputs from the position detectors 15a to 15d. On the basis of these outputs, the processing circuit 338 obtains a real axial position signal which does not contain an error component appearing in the output from the axial position detector 25 due to the radial position of the movable member 4. A control circuit 339 obtains a deviation between the obtained axial position signal and an objective position signal H. This deviation is converted to an electric current by a current amplifier 340, and the current is supplied to the cylindrical coil 22. By this control, the movable member 4 is moved and stopped at the objective position.

In the vibration damping control unit 360, outputs from the position detectors 15a to 15d are supplied to a processing circuit 361. The processing circuit 361 obtains a rotational displacement signal by the procedures described below. The rotational displacement signal is input to a control circuit 362. An output signal from the control circuit 362 is converted to an electric current by a current amplifier 363. The electric current is supplied to the control coil 30.

The control circuit 362 comprises a comparing circuit 364, a rotational control current setting circuit 365 and a rotational control circuit 366, as shown in FIG. 18. The comparing circuit 364 compares the change of the output, i.e. the signal slope of the output from the processing circuit 361 with a zero value, and activates the rotational control current setting circuit 365 when the signal slope of the rotational displacement is a negative number. The rotational control current setting circuit 365 determines an electric current to be applied to the control coil 30, and the rotational control circuit 366 determines the timing at which the current is applied to the control coil 30.

In the above structure, when the magnetic bearing 10 is activated, the bias coils 17 are excited and the control coils 18 are excited by a current having a polarity corresponding to the direction of displacement and a level corresponding to the amount of radial displacement of the movable member 4. Specifically, the lengths of magnetic gaps between the magnetic pole faces of the yokes 11a to 11d and the magnetic pole faces of the projecting magnetic poles 13a to 13d are obtained on the basis of outputs from the radial position detectors 15a to 15d. Where the magnetic gap length is large, the control coil 18 is excited so as to increase the magnetic flux passing through this gap. On the other hand, where the magnetic gap length is small, the control coil 18 is excited so as to decrease the magnetic flux passing through the magnetic gap. Thus, the movable member 4 is supported by the magnetic bearing 10 in non-contact with the stationary body 1.

When the objective position signal H is applied, the electromagnetic force generating mechanism 20 is operated. According to the same principle as that of a conventional voice coil motor, the electromagnetic force generating mechanism 20 applies an axial driving force to the movable member 4 in a non-contact manner and stops the movable member 4 at an objective position. In this case, the axial position required for position control is found in a non-contact manner by the axial position detector 25 which detects the inclined surface 24 of the auxiliary plate 23. Thus, axial driving and positioning is performed in a perfect non-contact manner.

When an external circumferential force is applied to the movable member 4 during operation and the movable member 4 vibrates about its axis, the following control is performed. Specifically, when a circumferential force is applied to the movable member 4, outputs from the position detectors 15a to 15d are converted to rotational displacement amounts by the processing circuit 361 of the vibration damping control unit 360.

Figure 11:
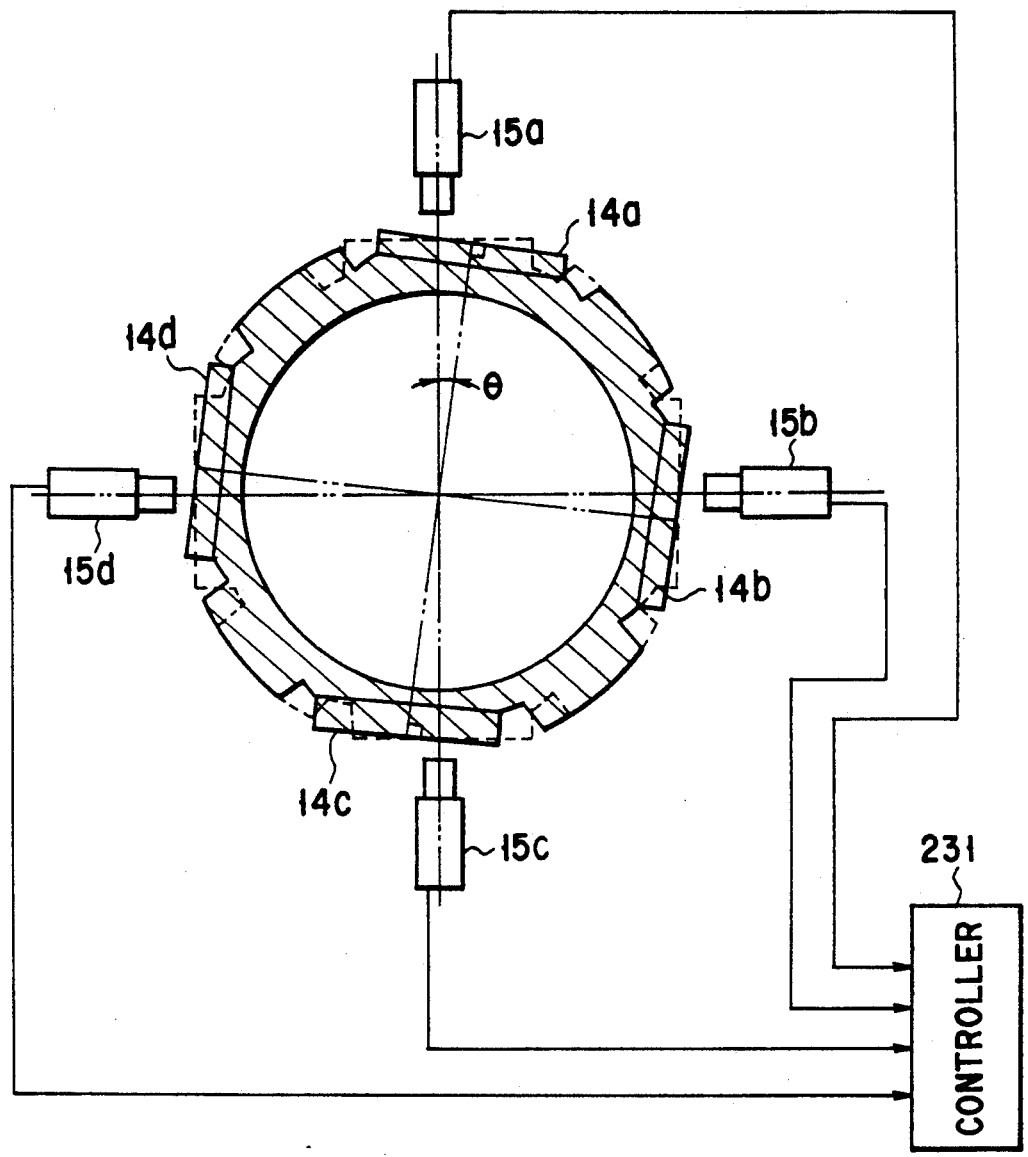
FIG. 11 illustrates the mutual relationship between the movable member and the position detector when a rotational displacement occurs in the third embodiment.

As is shown in FIG. 11, when a rotational force is applied to the movable member 4 and the movable member 4 is rotated about its axis over an angle &H from the position of a broken line to the position of a solid line, the outputs from the position detectors 15a to 15d vary.

The output of the position detector 15a is d0 when the movable member 4 is not rotated. When the movable member 4 is rotated by $\theta$ and the flat face 14a of the movable member 4 is inclined, the right end of the flat face 14a becomes closer to the position detector 15a, than the left end of the flat face 14a, in the detection area of the position detector 15a, with the result that the output from the position detector 15a decreases. When the variation of the output of the position detector 15a is $\delta d$, the output d1 of the position detector 15a is given by $$d1 = d0 - \delta d$$

Similarly, the output d3 of the position detector 15c situated diametrically opposite to the position detector 15a is given by $$d3 = d0 - \delta d$$

The sum d13 of these outputs is $$d13 = 2d0 - 2\delta d$$

In the above embodiment, when the rotational displacement is zero, the output of the position detectors 15a and 15c is d0. However, since the position of the shown movable member 4 is a nominal position in the case where the movable member 4 is normally magnetically levitated, this value d0 is adjusted to zero. Accordingly, $$d13 = -2\delta d$$

and only the value resulting from the rotation is output. Thus, the sum $d\delta 1$ of the outputs of the four position detectors 15a to 15d at the position indicated by arrow 612 is given by $$d\delta 1 = -4\delta d$$

Similarly, the sum $d\theta 2$ of the outputs of the position detectors 15a to 15d at positions indicated by arrow 614 (in FIG. 15) is given by $$d\theta 2 = -4\delta d$$

Even if these sums are summed, only the value resulting from the rotation can be detected. This sum $d\theta$ is given by $$d\theta = -8\delta d.$$

All values d13, $d\theta 1$, $d\theta 2$ and $d\theta$ are values resulting from the rotation. Normally, $\delta d$ is a small value. Thus, it is preferable to adopt $d\theta$ with a greater S/N as the value resulting from the rotation. In this embodiment, the processing circuit 361 finds the rotational displacement amount on the basis of $d\theta$.

The obtained rotational displacement signal is input to the comparing circuit 364. The comparing circuit 364 compares the change of the input rotational displacement signal, i.e. the signal slope of the input rotational displacement signal with a zero value and delivers the rotational displacement signal to the rotational control current setting circuit 365 only when the signal slope of the rotational displacement signal is a negative number. The rotational control current setting circuit 365 outputs a signal proportional to the rotational displacement signal. This signal is delivered to the rotational control circuit 366. The rotational control circuit 366 detects the variation of the input signal. In this embodiment, the signal proportional to the input signal is output only during the period in which the absolute value of the input signal varies in the direction of decrease. The output signal is delivered to the current amplifier 363.

As is shown in FIG. 19, when a clockwise rotational force acts on the movable member 4, the movable member 4 rotates from the position of a broken line to that of a solid line. When the rotational displacement of the movable member 4 is $\theta$, a circumferential left end portion 54a of the projecting magnetic pole 13c approaches a magnetic pole face 28a of the yoke 29 of the electromagnet 27, as shown in FIG. 19. At the time the rotational displacement is maximum, the left end portion 54a is closest to the magnetic pole face 28a. Then, the portion 54a goes away from the pole face 28a, and a right end portion 54b begins to approach the pole face 28a. In this manner, when the movable member 4 vibrates about its axis, the rotational displacement amount varies, as shown in FIG. 12. In this embodiment, if the control coil 30 is excited when the left end portion 54a is displaced in the direction of approaching the magnetic pole face 28a in FIG. 19, a magnetic attraction force acts between the left end portion 54a and the magnetic pole face 28a in a direction of increasing the displacement amount.

In this embodiment, the rotational control circuit 366 determines the direction of movement of the left end portion 54a, and excites the control coil 30 only when the left end portion 54a moves in a direction away from the magnetic pole face 28a, i.e. during time periods t1–t2, t3–t4 and t5–t6 shown in FIG. 12. Thereby, energy of the movable member 4 restoring to the position of zero displacement is absorbed. Thus, the vibration of the movable member 4 about its axis can be quickly damped.

In this embodiment, the vibration of the movable member about its axis is damped by applying a control current to the control coil 30 of the electromagnet 27 on the basis of the magnitude and time-based variation of the rotational displacement amount. Thus, the damping is more effective than in the case where, for example, a control current is superimposed on the bias coils 17 or new structural parts are added.

The structures of the comparing circuit 364, rotational control current setting circuit 365 and rotational control circuit 366 of the vibration damping control unit 360 are not complex. These circuits may be constituted by analog circuits by using some operational amplifiers, some resistors and capacitors. Even where these circuits are constituted by digital circuits, the circuits can be constituted by A/D converters, D/A converters, interfaces, programs of 20–80 steps (depending on computer languages), etc. Thus, the structure of this embodiment is not complex.

As has been described above in detail, the vibration of the movable member about its axis can be effectively damped only by adding one electromagnet for rotation control.

Figure 20:
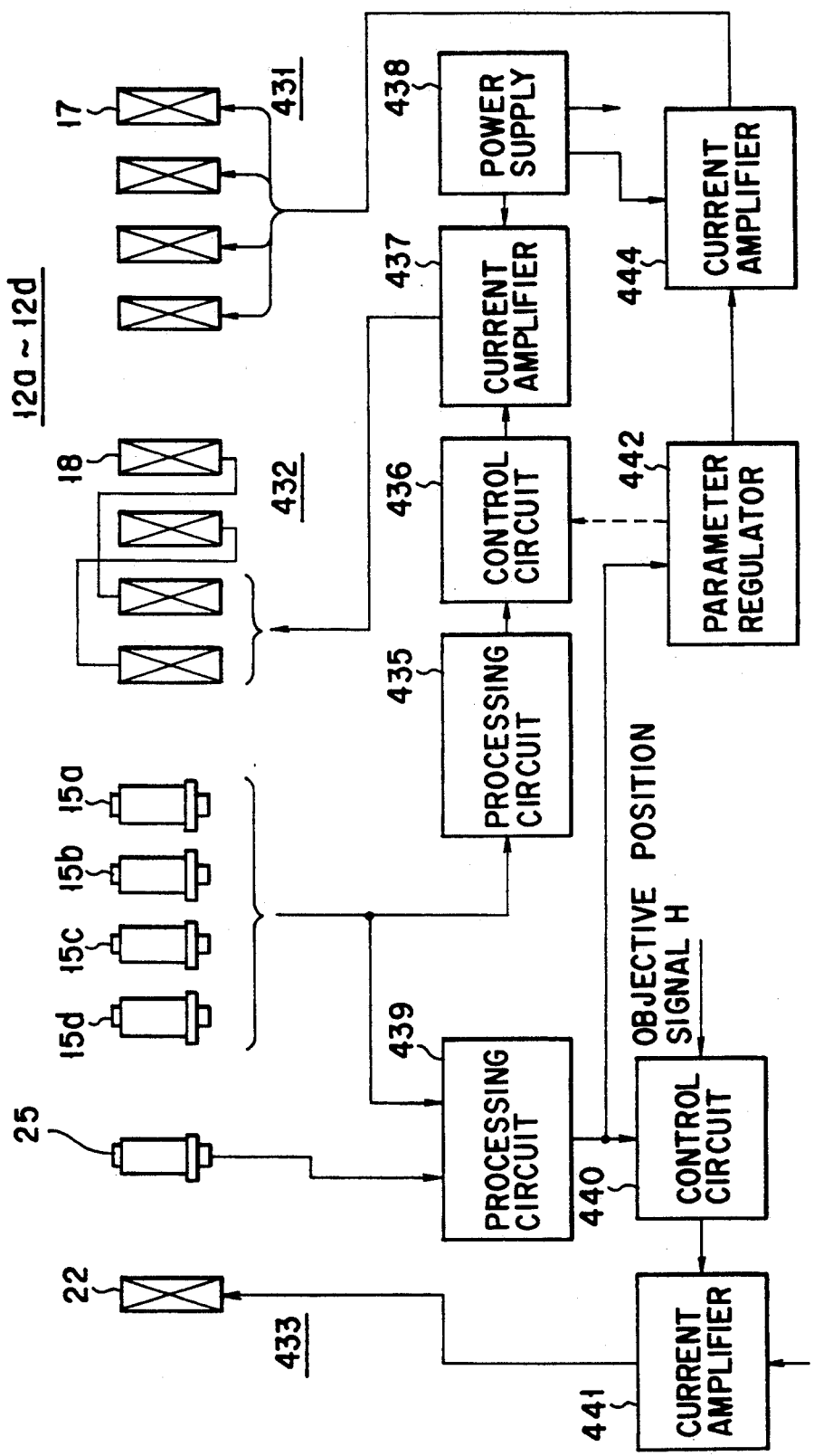
FIG. 20 is a block diagram of a controller of a linear movement/support device according to a fifth embodiment.

A linear movement/support device according to a fifth embodiment of the invention will now be described with reference to FIGS. 20 to 22. The mechanical components of the device of the fifth embodiment are identical to those of the device of the first embodiment shown in FIG. 1, and description thereof is omitted. The control components of the device of the fifth embodiment are different from those of the devices of the first to fourth embodiments, as shown in FIG. 20. Specifically, a controller 431 shown in FIG. 20 is connected to the axial movement amount detector 25 shown in FIG. 1, cylindrical coil 22, and bias coils, control coils and position detectors of the main components 10a and 10b of the magnetic support device 10.

The controller 431 comprises a magnetic support control unit 432 and an axial movement amount control unit 433. FIG. 20 shows the magnetic support control unit 432 for activating the coils 12a to 12d of the main component 10a, but does not show the control unit for activating the coils of the main component 10b.

In the magnetic support control unit 432, a processing circuit 435 receives outputs from the four movement amount detectors 15a to 15d and converts the outputs to radial displacement amounts. These displacement amounts are input to a control circuit 436, and operation amounts are determined on the basis of the differences between the displacement amounts and reference positions. The operation amounts are converted to electric currents by a current amplifier 437, and the currents are applied to the control coil 18 of the coils 12a to 12d. An input terminal of the current amplifier 437 is connected to a power supply 438. On the other hand, axial movement amount signals output from a processing circuit 439 of the axial position control unit 433 (described below) are input to a parameter adjuster 442, and operation amounts are determined to meet a force equilibrium condition and a non-interference condition between center-of-gravity movement and rotational movement about the center of gravity.

Referring to FIG. 21, a coordinate system o-xyz is defined in a space where the axis of the movable member 4 (supported in an equilibrium state), which has an original point o at the center of gravity G of the movable member 4 at its initial position, coincides with the z-axis. The center-of-gravity movement of the movable member 4, the rotational movement of the movable member 4 in the xz plane, and the rotational movement in the yz-plane are approximately expressed as follows, when a variation from the equilibrium state is small.

First, the center-of-gravity movement is expressed by $$M \cdot \ddot{x} = F1 - F3 + F5 - F7 + M0 \cdot g \quad (1)$$

$$M \cdot \ddot{y} = F2 - F4 + F6 - F8 + M0 \cdot g \quad (2)$$

wherein $\ddot{x}$ is a differentiation $d/dt$ by time t, M is the mass of movable member 4, M0 is an electromagnet attraction force vector of M (M0=M/2), F1 to F8 are attraction forces of the electromagnets acting on the movable member 4, and g is the gravitational acceleration.

The rotational movement is expressed by $$I \cdot \ddot{\theta}x = -(F2-F4) \cdot L1 + (F6-F8) \cdot L2 \quad (3)$$

$$I \cdot \ddot{\theta}y = (F1-F3) \cdot L1 - (F5-F7) \cdot L2 \quad (4)$$

wherein I is the radial moment of inertia, L1 is the distance between the center of gravity G of the movable member 4 and the point of action of F1 to F4 in the positive direction of z-axis, and L2 is the distance between the center of gravity G of the movable member 4 and the point of action of F5 to F8 in the negative direction of z-axis.

Supposing that all electromagnets have the same characteristics, the parameter adjuster 442 adjusts control parameters so as to meet the equilibrium conditions $$F3 = F1 + L2/(L1+L2) \cdot M0 \cdot g \quad (5)$$

$$F4 = F2 + L2/(L1+L2) \cdot M0 \cdot g \quad (6)$$

$$F7 = F5 + L1/(L1+L2) \cdot M0 \cdot g \quad (7)$$

$$F8 = F6 + L1/(L1+L2) \cdot M0 \cdot g \quad (8)$$

and the non-interference conditions $$(F1-F3) \cdot L1 - (F5-F7) \cdot L2 = 0 \quad (9)$$

$$(F2-F4) \cdot L1 - (F6-F8) \cdot L2 = 0 \quad (10)$$

Specifically, using the level of excitation current applied constantly to each bias coil 17, the level of the constant excitation current is determined in conformity to the movement amount of the movable member 4. The output from the parameter adjuster 442 is converted to an electric current by the current amplifier 444, and the current is applied to the bias coils 17 of the coils 12a to 12d.

In the axial movement amount control unit 433, a processing circuit 439 receives an output from the axial movement amount detector 25 and outputs from the position detectors 15a to 15d. On the basis of these outputs, the processing circuit 439 obtains a real axial position signal which does not contain an error component appearing in the output from the axial movement amount detector 25 due to the radial position of the movable member 4. A control circuit 440 obtains a deviation between the obtained axial position signal and an objective position signal H. This deviation is converted to an electric current by a current amplifier 441, and the current is supplied to the cylindrical coil 22. By this control, the movable member 4 is moved and stopped at the objective position.

The apparatus having the above structure operates as follows. When the magnetic bearing 10 is activated, the bias coils 17 are excited and the control coils 18 are excited by a current having a polarity corresponding to the direction of displacement and a level corresponding to the amount of radial displacement of the movable member 4. Specifically, the lengths of magnetic gaps between the magnetic pole faces of the yokes 11a to 11d and the magnetic pole faces of the projecting magnetic poles 13a to 13d are obtained on the basis of outputs from the radial position detectors 15a to 15d. Where the magnetic gap length is large, the control coil 18 is excited so as to increase the magnetic flux passing through this gap. On the other hand, where the magnetic gap length is small, the control coil 18 is excited so as to decrease the magnetic flux passing through the magnetic gap. Thus, the movable member 4 is supported by the magnetic bearing 10 in non-contact with the stationary body 1. In this embodiment, an offset signal F is applied to a control circuit 235, thereby varying the radial stable position of the movable member 4.

When the objective position signal H is applied, the electromagnetic force generating mechanism 20 is operated. According to the same principle as that of a conventional voice coil motor, the electromagnetic force generating mechanism 20 applies an axial driving force to the movable member 4 in a non-contact manner and stops the movable member 4 at an objective position. In this case, the axial position required for position control is found in a non-contact manner by the axial position detector 25 which detects the inclined surface 24 of the auxiliary plate 23. Thus, axial driving and positioning is performed in a perfect non-contact manner.

In this device, the bias coils 17 are supplied with a constant excitation current in accordance with the axial movement amount of the movable body 4. This constant excitation current meets the equilibrium conditions of force including force due to the magnetic support device 10 and the non-interference conditions between the center-of-gravity movement of the rotational member and the rotational movement. Accordingly, theoretically, rotational movement is not influenced by external disturbance from the base 2 in the center-of-gravity direction. When the movable member 4 is precisely positioned in the rotational direction, the characteristic frequency of the rotational movement system is increased and the characteristic frequency of the center-of-gravity movement system is decreased. Thereby, transmitted vibration is reduced and the positioning precision is maintained. On the other hand, when precise positioning for center-of-gravity movement can be performed by suppressing resonance of the support system and stopping vibration quickly.

FIG. 22 shows an example wherein the bias coils 17 are supplied with constant currents I1 to I8 which meet the aforementioned force equilibrium conditions and noninterference conditions. In FIG. 22, the constant excitation currents I5 to I8 are zero at the position of movement amount LG, because the position of the center of gravity G of the movable member 4 coincides with the position of the yokes 11a to 11b provided on the line of arrow A (see FIGS. 7 and 21). Accordingly, the rotational control of the movable member 4 is not controlled at the position of movement amount LG. Thus, in order to put stress on the rotational movement control, it suffices to prevent the maximum movement amount from exceeding LG or to stop renewal or updating of constant excitation currents at least at the position of LG. In FIG. 22, I1 and I2 are constant, but this embodiment is not limited to this.

The present invention is not limited to the above embodiment. In the linear movement/magnetic support device capable of satisfying the above conditions, the parameter adjuster may be provided with additional functions of renewing control models of the magnetic support system and compensation parameters. In the system meeting the force equilibrium conditions and noninterference conditions, the control system for center-of-gravity movement can be designed independently from that for rotational movement. Thus, if the parameter adjuster 442 is provided with the additional function of renewing control models and compensation parameters for stable support, the characteristics of the magnetic support system can be constantly maintained irrespective of the movement amount of the movable member 4.

A general formula of the control model will now be described. A movement equation in the x-direction is given by $$f = M \ddot{x} - KD(L1) \cdot x + KU(L1) \cdot UX \qquad (11)'$$

wherein f is the external force, KD(L1) is the negative equilibrium hardness at movement amount L1, and KU(L1)·UX is the control force for stabilization as a function of the movement amount L1. In particular, UX is a feedback operation amount for stabilizing the system on the basis of observation values such as a displacement x, a velocity of one-stage differentiation of x, and an acceleration of two-stage differentiation of x.

The parameters of kD(L1) and KU(L1) in this general formula are updated in accordance with the movement amount of the movable member 4. In addition, the compensation parameter for determining the feedback operation amount UX is updated on the basis of KD(L1) and KU(L1) and desired support characteristic conditions. In accordance with updating, the control constants in the control circuit 436 are adjusted.

With the above structure, constant magnetic support characteristics are obtained over the entire axial movement amounts of the movable member 4.

In the above embodiment, the bias coils are provided, but the control may be performed with only the control coils. In the above embodiment, two sets of electromagnets required for magnetic support are arranged in the axial direction. However, three sets of electromagnets may be arranged. Further, in the above embodiment, the control parameters are successively adjusted. However, the control parameters may be adjusted intermittently.

As has been described above, the control parameters of the magnetic support control system are adjusted in accordance with the axial movement amount of the movable member. Thus, the movable member can be supported with no interference between the center-of-gravity movement of the movable member and the rotational movement about the center of gravity. Further, the design of this embodiment is simple since the control system for center-of-gravity movement can be designed independently from the control system for rotational movement. Moreover, the influence on the rotational movement due to external disturbance in the center-of-gravity direction from the base and the influence on the center-of-gravity movement due to external disturbance in the rotational direction, which is related to positioning precision, can easily be reduced by suitable measures. Thus, desired support characteristics can be stably ensured over the entire movement amounts.

Figure 23:
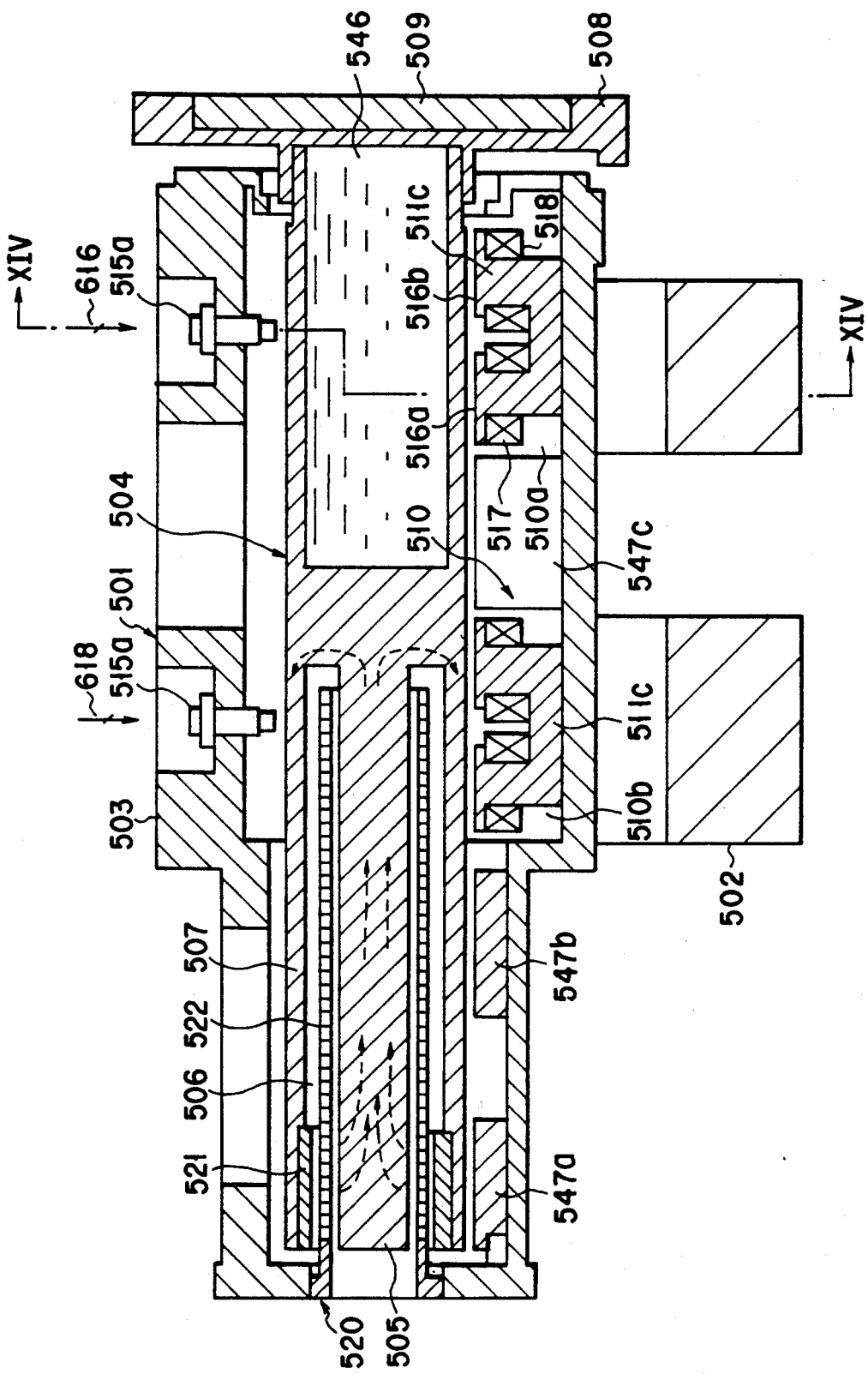
FIG. 23 is a cross-sectional view of a linear movement/support device according to a sixth embodiment of the present invention, taken along line XXIII—XXIII in FIG. 24, as viewed in the direction of arrows.

A linear movement/support device according to a sixth embodiment of the present invention will now be described with reference to FIGS. 23 to 25. In FIG. 23, a stationary body 501 comprises a base 502 and a non-magnetic cylindrical member 503 fixed on the base 502. A substantially columnar movable member 504 is situated within the cylindrical member 503 so as to be movable along the axis of the cylindrical member 503.

The movable member 504 is formed of a magnetic material. An almost right half portion of the movable member 504 (in FIG. 23) is hollow, and an almost left half portion thereof is constructed such that a center rod portion 505, a cylindrical bore 506 and an outer cylindrical portion 507 are concentrically arranged. A mirror support member 508 is mounted on a right end portion (in FIG. 23) of the movable member 504. A scan mirror 509 is fixed on the mirror support member 508.

A magnetic bearing 10 is situated between the cylindrical member 503 and movable member 504 and supports the movable member 504 in non-contact with the cylindrical member 503. Main components 510a and 510b of the magnetic bearing 510 are provided at two axial positions indicated by arrows 616 and 618 in FIG. 23.

The magnetic bearing 510 is of attraction support type. FIG. 24 shows representatively the main component 510a (indicated by arrow 616) of main components 510a and 510b. Specifically, the main component 510a comprises yokes 511a, 511b, 511c and 511d, which are fixed on the inner peripheral surface of the cylindrical member 503 at angular intervals of 90° in the circumferential direction and have their magnetic pole faces opposed to the axis of the movable member 504, coils 512a, 512b, 512c and 512d mounted on the yokes, projecting magnetic poles 513a, 513b, 513c and 513d formed on the outer peripheral surface of the movable member 504 at angular intervals of 90° in the circumferential direction and extending over almost the entire length of the movable member 504, flat faces 514a, 514b, 514c and 514d of non-magnetic substance (e.g. stainless steel plate) which are formed between the projecting magnetic poles and extend over almost the entire length of the movable member 504 for radial displacement detection, and radial position detectors 515a, 515b, 515c and 515d fixed on the cylindrical member 503 between the yokes for detecting the distance between the detectors and the flat faces.

FIG. 23 shows representatively the yoke 511c of the yokes 511a to 511d. The yoke 511c has two magnetic pole faces 516a and 516b and is fixed on the inner surface of the cylindrical member 503 such that these two magnetic pole faces 516a and 516b are axially arranged. The coils 512a to 512d mounted on the yokes 511a to 511d comprise bias coils 517 and control coils 518. The bias coils 517 mounted on the yokes opposed to each other with the movable member 504 interposed are connected in series so as to generate magnetic fluxes in opposite directions. On the other hand, the control coils 518 mounted on these yokes are connected in series so as to generate magnetic fluxes in the same direction.

The two magnetic pole faces 516a and 516b of each of the yokes 511a to 511d and the magnetic pole faces of the four projecting magnetic poles 513a to 513d provided on the movable member 504 have arcuated cylindrical shapes, defined about the axis of the movable member 504, so as to prevent these pole faces from coming into contact with each other during rotation. The other main component 510b has the same structure as the main component 510a.

The left portions (in FIG. 23) of the movable member 504 and cylindrical member 503 are provided with an electromagnetic force generating mechanism 520 for applying an axial driving force to the movable member 504 selectively in a non-contact manner. The electromagnetic force generating mechanism 520 has the same structure as a conventional one. The electromagnetic force generating mechanism 20 comprises an annular permanent magnet 521 magnetized in the radial direction, and a cylindrical coil 522. The annular permanent magnet 521 is fixed on the inner peripheral surface of an open end portion of the outer cylindrical portion 507. The cylindrical coil 522 is inserted in the cylindrical bore 56 in a non-contact manner. The proximal end of the cylindrical coil 522 is fixed on the cylindrical member 503.

Figure 25:
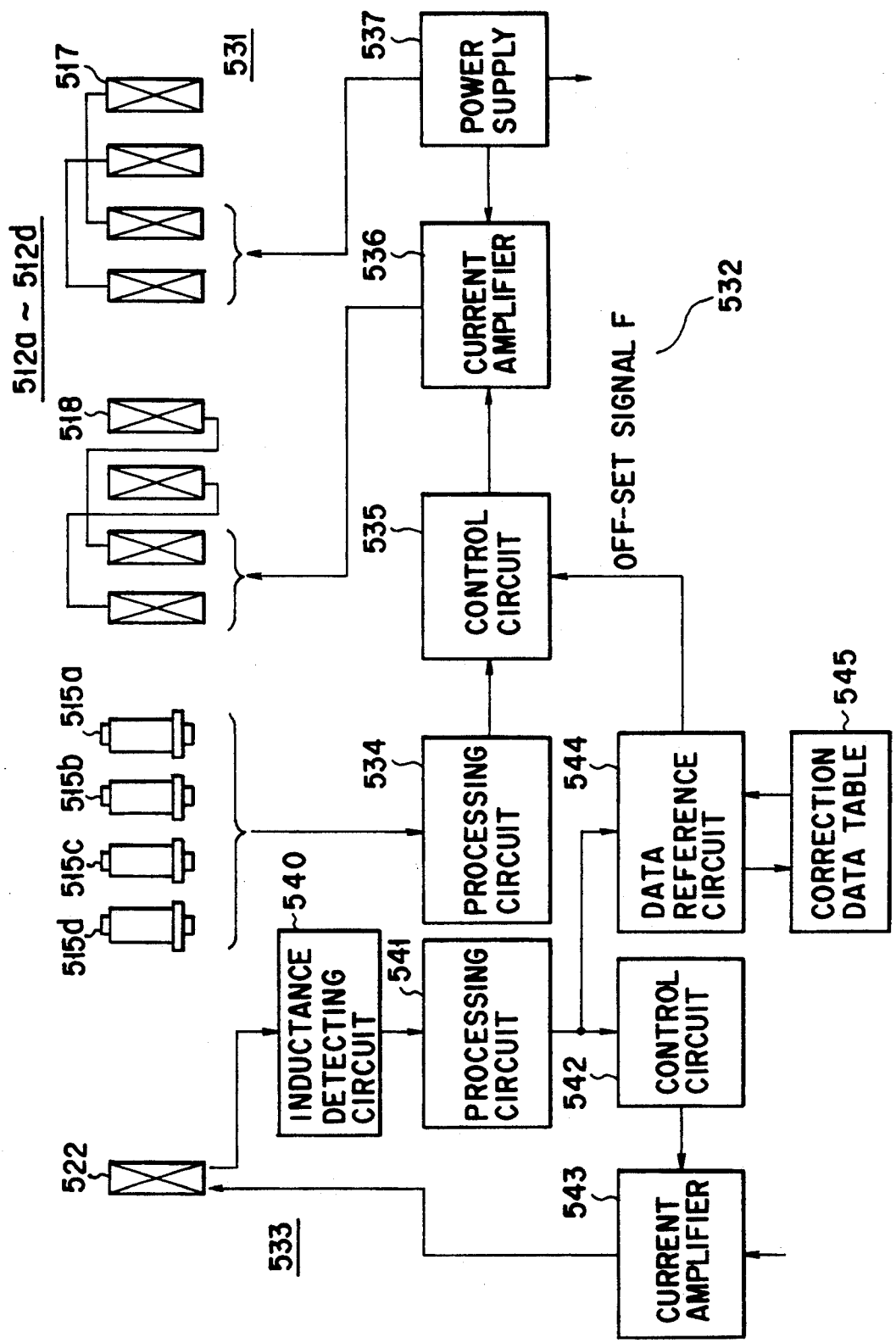
FIG. 25 is a block diagram of a controller of the device according to the sixth embodiment.

A main unit of a controller, as shown in FIG. 25, is connected to the bias coils, control coils and radial position detectors of the main components 510a and 510b of the magnetic bearing 510, and the cylindrical coil 522.

The controller comprises a magnetic bearing control unit (not shown), an axial position control unit (not shown) and an attitude correction control unit (not shown). FIG. 25 shows the magnetic bearing control unit for activating the coils 512a to 512d of the main component 510a, but omits a control unit for activating the coils of the main component 510b.

In the magnetic bearing control unit 526, outputs from the four radial position detectors 515a to 515d are input to a processing circuit 534. The processing circuit 534 converts the inputs to radial displacement amounts. These radial displacement amounts are delivered to a control circuit 535. The control circuit 535 determines the operation amounts on the basis of the difference between the displacement amounts and reference positions. A current amplifier 536 converts the operation amounts to electric currents, and applies the currents to the control coils 518 of the coils 512a to 512d. The bias coils 517 of the coils 512a to 512d are supplied with a constant current from a power supply 537. The main component 510b is controlled similarly. By this control, the movable member 504 is levitated at a radial reference position in non-contact with the stationary body 501.

In the axial position control unit 527, an inductance detection circuit 540 detects the inductance of the cylindrical coil 522, and the detection signal is input to a processing circuit 541 to obtain an axial position signal of the movable member 504. A control circuit 542 obtains a deviation between the obtained axial position signal and an objective position signal H. This deviation is converted to an electric current by a current amplifier 543, and the current is supplied to the cylindrical coil 522. By this control, the movable member 504 is moved and stopped at the objective position.

On the other hand, in the attitude correction control circuit 528, the axial position signal obtained by the processing circuit 541 is input to a data reference circuit 544. Upon receiving the axial position signal, the data reference circuit 541 reads out correction data corresponding to the axial position from a correction data table 545. The correction data is supplied as an offset signal F to the control circuit 535 of the magnetic bearing control unit 526. The correction data table 545 stores the correction data for correcting an error, on the basis of the relationship between the axial position of the movable member 504 and an attitude error at the time the levitation of the movable member 504 is controlled by using only the magnetic bearing control unit 526. The correction data read out from the correction data table 545 is input to the control circuit 535 and is superimposed on the operation amounts as offset signal F in the control circuit 535.

Figure 24:
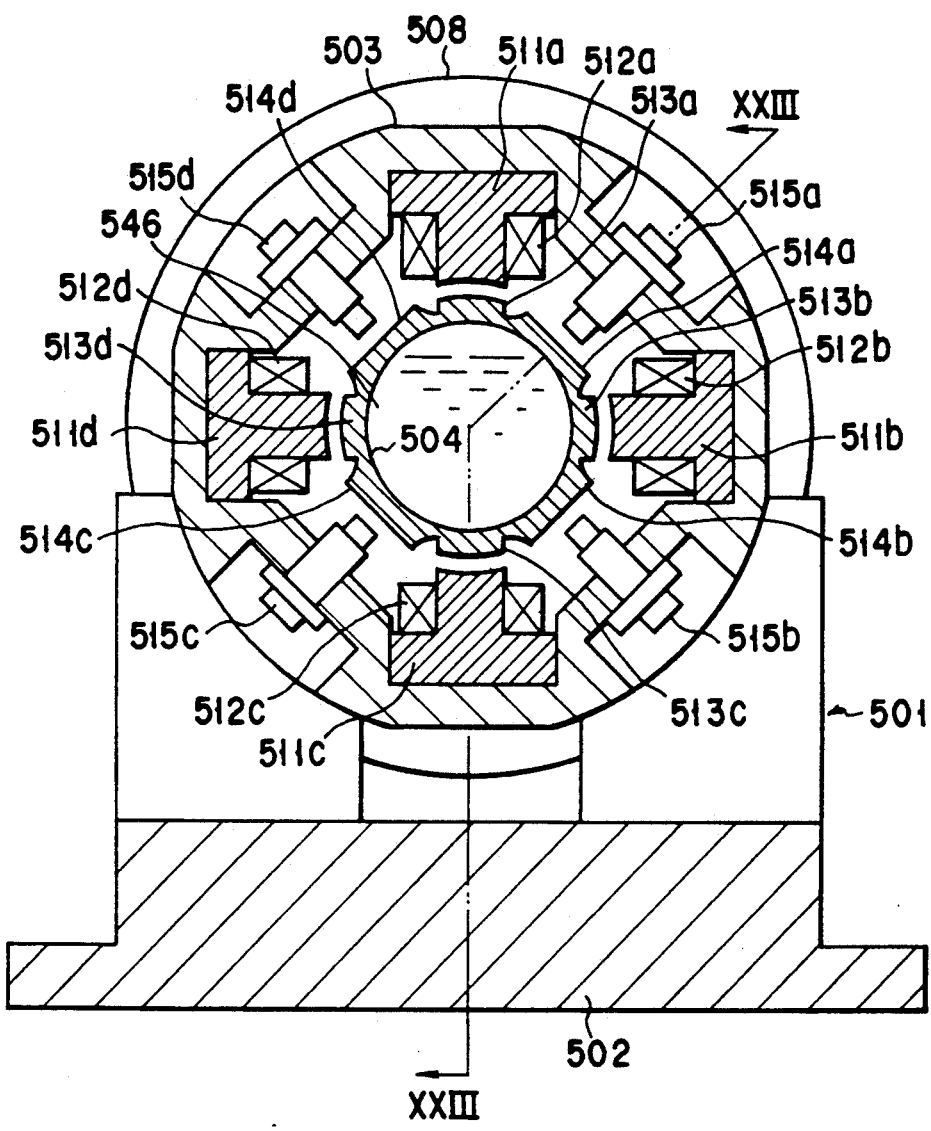
FIG. 24 is a cross-sectional view of the device according to the sixth embodiment, taken along line XIV—XIV in FIG. 23, as viewed in the direction of arrows.

In FIGS. 23 and 24, numeral 46 denotes a liquid filled in a hollow portion of the movable member 504. The liquid 546 absorbs and damps vibration energy by viscous friction with the movable member 504 when the movable member 504 is vibrated about its axis owing to external disturbance. In addition, numerals 547a, 547b and 547c denote touchdown bearings for supporting the movable member 504 when the movable member 504 is not levitated.

With the above structure, when the magnetic bearing 510 is activated, the bias coils 517 are excited by a constant current and the control coils 518 are excited by a current having a polarity corresponding to the direction of displacement and a level corresponding to the amount of radial displacement of the movable member 504. Specifically, the lengths of magnetic gaps between the magnetic pole faces of the yokes 511a to 511d and the magnetic pole faces of the projecting magnetic poles 513a to 513d are obtained on the basis of outputs from the radial position detectors 515a to 515d. Where the magnetic gap length is large, the control coil 518 is excited so as to increase the magnetic flux passing through this gap. On the other hand, where the magnetic gap length is small, the control coil 518 is excited so as to decrease the magnetic flux passing through the magnetic gap. Thus, the movable member 504 is supported by the magnetic bearing 510 in non-contact with the stationary body 501.

When the objective position signal H is applied, the electromagnetic force generating mechanism 520 is operated. According to the same principle as that of a conventional voice coil motor, the electromagnetic force generating mechanism 520 applies an axial driving force to the movable member 504 in a non-contact manner and stops the movable member 504 at an objective position. In this case, the axial position detection necessary for position control is effected by the inductance detecting circuit 540 and processing circuit 541. Since the electromagnetic force generating mechanism 520 is composed by a voice coil motor, the overlapping degree between the center rod portion 505 and outer cylindrical member 507, on the one hand, and cylindrical coil 522, on the other hand, varies in accordance with axial movement of the movable member 504. The inductance of the cylindrical coil 522 varies with the variation of the overlapping degree. Thus, the axial position of the movable member 504 can be found from the inductance of the cylindrical coil 522. In this embodiment, in the inductance detecting circuit 540, a small high-frequency wave voltage signal which does not influence axial movement is applied to the cylindrical coil 22, and the inductance is detected from a current signal delayed by $\pi/2$ from the voltage signal. Thus, both axial driving and positioning is effected in a perfect non-contact manner.

On the basis of the axial position signal output from the processing circuit 541, correction data corresponding to the axial position is read out from the correction data table 545. The correction data is supplied to the control circuit 535 of the magnetic bearing control unit 526 and is superimposed on the operation amounts as offset signal F in the control circuit 535. Accordingly, the attitude of the movable member 504 is maintained precisely.

In this manner, the correction data table 545 stores the correction data for correcting an error, on the basis of the relationship between the axial position of the movable member 504 and the attitude error. Based on the axial position signal, the axial position correction data is read out from the correction data table 504. Using the read-out correction data, the attitude of the movable member 504 is adjusted. Accordingly, the precision in attitude of the movable member 504 can be enhanced irrespective of the machining precision of the flat faces 514a to 514d for position detection, etc. In addition, since the position of the movable member 504 is controlled in a perfect non-contact manner, precise positioning can stably be effected over a long distance for a long time in a special environment of, e.g. vacuum.

In the above embodiment, only the attitude of the movable member 504 is corrected, but the radial position thereof may be corrected simultaneously.

In the above embodiment, when the movable member 504 is affected by external disturbance about its axis, the vibration about the axis is passively damped by the magnetic attraction force acting between the yokes 511a to 511d and the projecting magnetic poles 513a to 513d. However, since the liquid is filled in the hollow portion of the movable member 504, the liquid 546 can quickly damp the vibration energy by the viscous friction with the movable member 504. This damping effect is increased as the contact area between the liquid 546 and movable member 504 increases or it is increased as the liquid path increases. Thus, it is advantageous to fill the liquid not only in the hollow portion of the movable member 504, but also in the inside of the mirror support member 508. Further, the moment of inertia increases by the filled liquid 546, and the movable member 504 is not easily vibrated by the external disturbance.

In the above embodiment, the bias coils are built in the magnetic bearing device 510. However, the bias coils may be replaced by permanent magnets. In the above embodiment, the two main components of the magnetic bearing device are arranged in the axial direction. However, three main components of the magnetic bearing device may be arranged.

As has been described above, according to the present invention, precise positioning of the movable member can be effected over a long distance in a special environment of, e.g. vacuum, without using a lubricant, irrespective of machining precision.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A device for supporting and linearly moving an object, said device comprising:

a stationary body having a cylindrical internal bore and an inner peripheral portion;

a movable member having an outer peripheral position and situated within the cylindrical internal bore to be axially movable in an axial direction in the cylindrical internal bore;

a magnetic bearing device, situated between the stationary body and the movable member, for electromagnetically levitating the movable member in relation to the stationary body, said magnetic bearing device comprising:

yokes having magnetic pole faces fixed on the inner peripheral portion of the stationary body at predetermined intervals in a circumferential direction of the inner peripheral portion of the stationary body, such that the magnetic pole faces of the yokes are directed to the movable member, coils mounted on the yokes, projecting magnetic poles formed on the outer peripheral portion of the movable member, such that projecting faces of the projecting magnetic poles, which are opposed to the magnetic pole faces of the yokes, are arranged at predetermined intervals in a circumferential direction of the outer peripheral portion of the movable member and extend in the axial direction of the movable member, position detection faces formed of the outer peripheral portion of the movable member between the projecting magnetic poles, the position detections faces extending axially, and position detectors, disposed on the stationary body and opposed to the position detection faces, for detecting the positions of the position detection faces, thereby detecting the distance between the movable member and a predetermined position in a non-contact manner;

axial position detection means, disposed on the stationary body and the movable member, for detecting an axial position of the movable member in the cylindrical internal bore in a non-contact manner;

electromagnetic force generating means, disposed on the stationary body and the movable member, for generating an electromagnetic force to be applied to the movable member to move the movable member axially; and control means for controlling the electromagnetic force generating means in relation to axial position data detected by the axial position detection means and externally supplied objective position data, thereby setting the axial position of the movable member in the cylindrical internal bore at a predetermined position.

2. The device according to claim 1, wherein at least two sets of said yokes, said coils and said position detectors are arranged in the axial direction of the stationary body.

3. The device according to claim 1, wherein each of said position detection faces is inclined with respect to the axis of the movable member, and each of said position detectors is used as said axial position detection means.

4. The device according to claim 1, wherein said axial position detection means comprises:

an auxiliary plate fixed on the movable member and having at least one an inclined surface inclined with respect to the axis of the movable member and a circular shape defined by the axis of the inclined surface; and a detector, disposed on the stationary body, for detecting the distance between the inclined surface of the auxiliary plate and a predetermined position in a non-contact manner.

5. The device according to claim 1, wherein said electromagnetic force generating means includes a voice coil motor.

6. A device for supporting and linearly moving an object, said device comprising:

a stationary body having a cylindrical internal bore;

a movable member having an outer peripheral portion and coupled to the object and situated within the cylindrical internal bore of the stationary body to be axially movable in an axial direction in the cylindrical internal bore of the stationary body;

yokes fixed on the inner peripheral portion of the stationary body at predetermined intervals in the circumferential direction of the inner peripheral portion of the stationary body, such that magnetic pole faces of the yokes are directed to the movable member;

bias coil mounted on the yokes, for being supplied with a predetermined bias current;

control coils mounted on the yokes, for being supplied with a predetermined control current;

projecting magnetic poles formed on the outer peripheral portion of the movable member, such that projecting faces of the projecting magnetic poles, which are opposed to the magnetic pole faces of the yokes, are arranged at predetermined intervals in a circumferential direction of the outer peripheral portion of the movable member and extend in the axial direction of the movable member;

position detection faces formed on the outer peripheral portion of the movable member along a circumference of the outer peripheral portion of the movable member between the projecting magnetic poles, the position detection faces extending axially;

position detectors, disposed on the stationary body and opposed to the position detection faces, for detecting positions of the position detection faces, thereby detecting a distance between the movable member and a predetermined position in a non-contact manner;

levitation means for controlling an electric current to be supplied to the coils in relation to outputs of the position detectors, thereby electromagnetically levitating the movable member at a predetermined position in the cylindrical internal bore; and vibration damping means for controlling an electric current to be supplied to the coils in relation to a sum signal of at least two of the outputs of the position detectors, said vibration damping means including means for superimposing the control current on the bias current, and supplying the superimposed current to the bias coil.

7. The device according to claim 6, wherein said vibration damping means includes means for superimposing the control current on the bias current only in a period in which the rotational displacement amount of the movable member increases.

8. The device according to claim 6, wherein said position detectors are volume variation detection type position detectors.

9. The device according to claim 8, further comprising:

a rotation control yoke situated such that a magnetic pole face thereof is directed to both circumferential end portions of at least one of the projecting magnetic poles formed on the movable member;

a control coil mounted on the rotation control yoke, and data acquisition means for acquiring rotational displacement data indicative of rotational displacement of the movable member of the basis of a sum signal of at least two of outputs from the position detectors, and outputting the rotation displacement data to said vibrating damping means.

10. The device according to claim 6, wherein said bias coils and control coils comprise common coils.

11. A device for supporting and linearly moving an object, said device comprising:

a stationary body having a cylindrical internal bore;

a movable member coupled to the object and situated within the cylindrical internal bore of the stationary body to be axially movable in the cylindrical internal bore of the stationary body;

yokes fixed on the inner peripheral portion of the stationary body at predetermined intervals in the circumferential direction of the inner peripheral portion of the stationary body, such that magnetic pole faces of the yokes are directed to the movable member;

coils mounted on the yokes;

projecting magnetic poles formed on the outer peripheral portion of the movable member, such that projecting faces of the projecting magnetic poles, which are opposed to the magnetic pole faces of the yokes, are arranged at predetermined intervals in the circumferential direction of the outer peripheral portion of the movable member and extend in the axial direction of the movable member;

position detection faces formed on the outer peripheral portion of the movable member along the circumference of the outer peripheral portion of the movable member between the projecting magnetic poles, the position detection faces extending axially;

position detectors, disposed on the stationary body and opposed to the position detection faces, for detecting the positions of the position detection faces, thereby detecting the distance between the movable member and a predetermined position in a non-contact manner;

levitation means for controlling an electric current to be supplied to the coils on the basis of outputs of the position detectors, thereby electromagnetically levitating the movable member at a predetermined position in the cylindrical internal bore.

a rotation control yoke situated such that a magnetic pole face thereof is directed to both circumferential end portions of at least one of the projecting magnetic poles formed on the movable member;

a control coil mounted on the rotation control yoke;

data acquisition means for acquiring rotational displacement data of the movable member on the basis of a sum signal of at least two of outputs from the position detectors; and vibration damping means for activating the control coil on the basis of a rotational displacement amount represented by the rotational displacement data acquired by the acquiring means, thereby damping the vibration of the movable member about its axis.

12. The device according to claim 11, wherein said position detectors are volume variation detection type position detectors.

13. A device for supporting and linearly moving an object, said device comprising:

a stationary body having a cylindrical internal bore surface;

a movable member having an outer peripheral surface and coupled to the object and situated within the cylindrical internal bore of the stationary body to be axially movable in the cylindrical internal bore of the stationary body;

electromagnets arranged between the inner peripheral surface of the stationary body and the outer peripheral surface of the movable member at two or more axial points, said electromagnets electromagnetically levitating the movable member in relation to the stationary body;

radial position detection means for detecting a radial position of the movable member;

magnet control means for controlling a magnetic force of the electromagnets in relation to an output from the radial position detection means;

axial movement amount detection means for detecting an axial movement amount of the movable member;

electromagnetic force generating means, for applying an axial driving force to the movable member; and control parameter adjusting means for adjusting a control parameter of the magnet control means in accordance with an output from the axial movement amount detection means, said control parameter adjusting means including level adjusting means for adjusting a level of a constant excitation current applied to the electromagnets, so as to meet force equilibrium conditions for total forces of the electromagnets and non-interference conditions for mutual non-interference between center-of-gravity movement and rotational movement both the center of gravity of the movable member, control model updating means for updating a magnetic support system model imagined in relation to the electromagnets, in accordance with the output from the axial movement amount detection means; and compensation parameter updating means for updating a compensation parameter of stabilizing the magnetic support system, in relation to the result of the control model updating means.

14. The device according to claim 13, wherein said control parameter adjusting means includes means for adjusting the control parameter of the magnet control means intermittently or successively.

15. The device according to claim 13, wherein said control parameter adjusted by the control parameter adjusting means is a level of a constant excitation current applied to the electromagnets.

16. A device for supporting and linearly moving an object, said device comprising:

a stationary body having a cylindrical internal bore;

a movable member coupled to the object and situated within the cylindrical internal bore of the stationary body to be axially movable in the cylindrical internal bore of the stationary body;

axial position detection means for detecting the axial position of the movable member in a non-contact manner;

a magnetic bearing device comprising electromagnets arranged between the inner peripheral surface of the stationary body and the outer peripheral surface of the movable member at predetermined intervals in the circumferential direction of the stationary body and the movable member, said electromagnets electromagnetically levitating the movable member in relation to the stationary body;

electromagnetic force generating means, for applying an axial driving force to the movable member, said electromagnetic force generating means including a voice coil motor having a driving coil;

a data table storing correction data for correcting at least an attitude error of the movable member over the entire axial movement range of the movable member;

read-out means for reading out, from the data table, the correction data corresponding to the axial position represented by the axial position data acquired by the axial position detection means; and attitude adjusting means for adjusting at least the attitude of the movable member by delivering the correction data read out by the read-out means to the magnetic bearing device.

17. The device according to claim 16, wherein said electromagnetic force generating means includes a voice coil motor having a driving coil, and said axial position detection means includes means for converting an inductance value of the driving coil to an axial position signal.

18. The device according to claim 16, wherein a liquid is filled within the movable member.

* * * * *